US012479536B2

(12) United States Patent
Chang et al.

(10) Patent No.: US 12,479,536 B2
(45) Date of Patent: Nov. 25, 2025

(54) GENERATION OF ELECTRICAL POWER OFFSHORE

(71) Applicant: Subsea 7 Norway AS, Stavanger (NO)

(72) Inventors: Paul Douglas Chang, Stavanger (NO); Ernst Kristen Helgoy Kloster, Stavanger (NO)

(73) Assignee: Subsea 7 Norway AS, Stavanger (NO)

( * ) Notice: Subject to any disclaimer, the term of this patent is extended or adjusted under 35 U.S.C. 154(b) by 658 days.

(21) Appl. No.: 17/771,490

(22) PCT Filed: Oct. 22, 2020

(86) PCT No.: PCT/EP2020/079820
§ 371 (c)(1),
(2) Date: Apr. 24, 2022

(87) PCT Pub. No.: WO2021/078899
PCT Pub. Date: Apr. 29, 2021

(65) Prior Publication Data
US 2022/0411025 A1 Dec. 29, 2022

(30) Foreign Application Priority Data
Oct. 25, 2019 (GB) .................................. 1915503

(51) Int. Cl.
*B63B 21/50* (2006.01)
*B63B 21/20* (2006.01)
(Continued)

(52) U.S. Cl.
CPC .............. *B63B 21/50* (2013.01); *B63B 21/20* (2013.01); *B63B 21/26* (2013.01); *B63B 27/29* (2020.05);
(Continued)

(58) Field of Classification Search
CPC ......... B63B 21/00; B63B 21/20; B63B 21/26; B63B 21/50; B63B 27/00; B63B 27/29;
(Continued)

(56) References Cited

U.S. PATENT DOCUMENTS

| 5,927,224 A | 7/1999 | Etheridge et al. |
| 6,408,781 B1 | 6/2002 | Daniels |

(Continued)

FOREIGN PATENT DOCUMENTS

| DE | 10 2012 100981 A1 | 8/2013 |
| EP | 2 789 849 A1 | 10/2014 |

(Continued)

OTHER PUBLICATIONS

International Preliminary Report on Patentability received in corresponding International Application No. PCT/EP2020/079820 dated Feb. 9, 2022.

(Continued)

*Primary Examiner* — Lars A Olson
(74) *Attorney, Agent, or Firm* — Mattingly & Malur, PC

(57) ABSTRACT

A floating power-generation group comprises a floating hub such as a spar buoy that is anchored to subsea foundations by anchor lines. Floating power producer units such as wind turbines are connected electrically and mechanically to the hub. The power producer units are each moored by mooring lines. At least one mooring line extends inwardly toward the hub to effect mechanical connection to the hub and at least one other mooring line extends outwardly toward a subsea foundation. The groups are combined as a set whose hubs are connected electrically to each other via subsea energy storage units. Anchor lines of different groups can share subsea foundations. The storage units comprise pumping machinery to expel water from an elongate storage volume and generating machinery to generate electricity from a flow (Continued)

of water entering the storage volume. The pumping machinery can be in deeper water than the generating machinery.

41 Claims, 16 Drawing Sheets

(51) Int. Cl.
    *B63B 21/26*     (2006.01)
    *B63B 27/00*     (2006.01)
    *B63B 35/44*     (2006.01)

(52) U.S. Cl.
    CPC ...... *B63B 35/44* (2013.01); *B63B 2035/4453* (2013.01); *B63B 2035/446* (2013.01); *B63B 2035/4466* (2013.01)

(58) Field of Classification Search
    CPC ... B63B 35/00; B63B 35/44; B63B 2035/446; B63B 2035/4466; F03D 1/00; F03D 1/04
    USPC .......................................................... 114/264
    See application file for complete search history.

(56) References Cited

U.S. PATENT DOCUMENTS

| | | | |
|---|---|---|---|
| 9,003,631 B2 * | 4/2015 | Yamamoto | B63B 35/44 405/195.1 |
| 9,352,807 B2 | 5/2016 | Tunbjer | |
| 2007/0224895 A1 | 9/2007 | Draper | |
| 2011/0241347 A1 | 10/2011 | Boureau et al. | |
| 2012/0121340 A1 * | 5/2012 | Pao | B63B 35/44 405/203 |
| 2014/0044541 A1 | 2/2014 | Dupin De La Gueriviere | |
| 2015/0367918 A1 | 12/2015 | Roddier et al. | |
| 2018/0010580 A1 | 1/2018 | Pitre et al. | |
| 2018/0312224 A1 | 11/2018 | Alm et al. | |

FOREIGN PATENT DOCUMENTS

| | | |
|---|---|---|
| GB | 2578473 A | 5/2020 |
| JP | 2004-176626 A | 6/2004 |
| JP | 3944445 B2 | 7/2007 |
| NL | 1008318 C | 8/1999 |
| WO | 97/29943 | 8/1997 |
| WO | 97/45318 | 12/1997 |
| WO | 97/48596 | 12/1997 |
| WO | 02/10589 A1 | 2/2002 |
| WO | 2006/042178 A1 | 4/2006 |
| WO | 2008/152505 A1 | 12/2008 |
| WO | 2014/055027 A1 | 4/2014 |
| WO | 2019/043105 A1 | 3/2019 |
| WO | 2019/191486 A1 | 10/2019 |

OTHER PUBLICATIONS

Written Opinion received in corresponding International Application No. PCT/EP2020/078920 dated Feb. 11, 2021.
International Search Report received in corresponding International Application No. PCT/EP2020/079820.
United Kingdom Search Report received in corresponding United Kingdom Application No. GB1915503.5 dated Mar. 20, 2020.
Norwegian Search Report received in corresponding Norwegian Application No. 20191273 dated May 25, 2020.

* cited by examiner

GENERATION OF ELECTRICAL POWER OFFSHORE

This invention relates to the generation of electrical power at offshore locations. The invention is particularly concerned with the challenges of stabilising power-generation facilities moored in deep water, such as the multiple windmills or wind turbines of a floating windfarm. The invention is also concerned with the challenges of transferring power among offshore power-generation facilities and for exporting power from such facilities, typically to an onshore power grid.

To date, floating wind turbines have typically been configured in parallel straight-line arrays. The turbines of such arrays are typically connected electrically in series by dynamic umbilicals and are also connected electrically to a floating substation structure.

Conventionally, floating wind turbines are anchored offshore via mooring lines that are connected to respective anchors placed on, or embedded into, the seabed. Such an arrangement is practical where the water is relatively shallow, for example with a depth of up to around 150 m. However, it is difficult to achieve sufficient stability with conventional mooring arrangements in significantly deeper water. Consequently, excessive movement of turbines relative to the seabed, and relative to each other, can generate unacceptable fatigue in the umbilicals or cables that are used to transfer power within a windfarm or to export power from the windfarm.

Another problem is that where multiple floating wind turbines are grouped in an offshore windfarm, the water column becomes congested with mooring lines. This presents a risk of clashing with or between mooring lines, especially as the horizontal spread of the moorings tends to increase with water depth.

WO 02/10589 discloses an anchoring pattern for multiple wind turbines, in which at least some mooring or stabilising lines of each turbine share subsea foundations with mooring or stabilising lines of other turbines. The arrangement disclosed relies on a primary taut vertical cable and auxiliary catenary cables serving as legs. However, the use of a vertical cable in deep water is impractical and presents an unacceptable risk of failure.

In JP 3944445, the wind turbines of an array are connected together by stabilising connecting lines. Intermediate weights on the connecting lines confer a degree of stability that may be sufficient for use in shallow water but are not sufficient for use in deep water. A larger stabilising system would be needed in that case.

EP2789849 discloses further examples of anchoring arrangements for floating wind turbines.

In view of these problems, the inventors have identified a need for improved layouts and mooring arrangements for offshore power-generation facilities, notably for windfarms that comprise multiple floating wind turbines. The advent of deep-water installation of wind turbines and the desirability of connection with subsea energy storage systems presents new challenges, especially in remote locations.

The prior art includes numerous mooring proposals for floating oil and gas production facilities. However, that prior art does not teach a solution to the problems addressed by the present invention. For example, WO 97/48596 discloses a mooring line pattern for a floating production vessel, in which catenary mooring lines double as flowlines for hydrocarbon production fluids.

Other prior art from the subsea oil and gas industry is too complex or otherwise wholly unsuitable for the purposes of the invention. For example, WO 2008/152505 teaches combining mooring lines and production risers through a disconnectable buoy between the seabed and the surface. In U.S. Pat. No. 6,408,781, a platform is anchored in deep water using a combination of deep-water mooring lines supported by intermediate buoys and shallow-water moorings connected to the buoys. WO 97/29943 discloses an even more complex mooring pattern in which various mooring lines are connected together.

Against this background, the invention provides a floating electric power-generation group that comprises: a floating hub such as a spar buoy or a buoyant platform that is anchored to a plurality of subsea foundations by a plurality of anchor lines; and at least two floating power producer units that are connected electrically and mechanically to the hub. The power producer units are each moored by a plurality of mooring lines, at least one of those mooring lines extending inwardly toward the hub to effect mechanical connection to the hub and at least one other of those mooring lines extending outwardly away from the hub toward one of the subsea foundations to effect mechanical connection to the subsea foundation.

The anchor lines and/or the mooring lines may, for example, be catenaries or taut legs that are held in tension by buoyant upthrust of the hub and/or the power producer units.

The outwardly-extending mooring lines may each be joined at a lower end to a lower chain section of a respective anchor line, or directly to a respective subsea foundation. In either case, each of the outwardly-extending mooring lines may conveniently share one of the subsea foundations with one of the anchor lines.

Similarly, the inwardly-extending mooring lines may each be joined at an upper end to an upper section of a respective anchor line, or directly to the hub.

Each power producer unit is suitably moored between an adjacent pair of the anchor lines radiating from the hub. In top plan view, the power producer units are preferably closer to the hub than the subsea foundations.

Each of the mooring lines extending from the power producer units may converge with or intersect one of the anchor lines. For example, the mooring lines may intersect the anchor lines at junctions between a major central wire or rope section of the anchor line and a minor upper or lower section of the anchor line. The upper and/or lower sections of the anchor line may, for example, be of chain.

The power producer units may be substantially equidistant from the hub, for example being distributed around a substantially circular array that is centred on the hub. In any event, the power producer units and the anchor lines may alternate circumferentially around the hub.

Conveniently, the hub may house switchgear in a dry environment. The hub may similarly house a step-up transformer that is connected to a power export link. Similarly, dry splice connections may be made between power umbilicals and the power producer units and the hub. Such umbilicals thereby effect electrical connections between the power producer units and the hub and may hang as catenaries between the power producer units and the hub.

The invention also provides a floating electric power-generation group that comprises: a floating hub and at least two floating power producer units that are connected electrically to the hub; wherein the floating hub is anchored to a plurality of subsea foundations that are located in plan view between the power producer units and the hub; wherein the power producer units are each moored by a plurality of mooring lines, at least one of those mooring lines extending inwardly and effecting mechanical connection to one of the subsea foundations located between the power producer unit and the hub, and at least one other of those mooring lines extending outwardly away from the hub toward a further subsea foundation located outboard of the power producer unit in plan view to effect mechanical connection to the further subsea foundation.

Each power producer unit may additionally be moored by a further mooring line that extends inwardly toward the hub to effect mechanical connection to the hub.

The power-generation group may generally include any of the features described above in connection with the first aspect of the present invention.

The inventive concept also embraces a set comprising a plurality of the electric power-generation groups of the invention, the hub of each of those groups being connected electrically to the hub of at least one other of those groups.

The power-generation groups of the set may be arranged in at least two rows. Alternatively, the power-generation groups of the set may include a central power-generation group and an array of power-generation groups that at least partially surround the central power-generation group, for example in a looped or circular array.

Elegantly, anchor lines extending from hubs of different groups of the set may be anchored to common subsea foundations.

The hub of at least one group of the set may be configured to serve as an electrical substation for the hub of at least one other group of the set.

Advantageously, the set may further comprise at least one subsea energy storage unit that is electrically connected to at least one of the hubs. Such an energy storage unit may, for example, comprise a storage volume in fluid communication with pumping machinery that is arranged to expel water from the storage volume and with generating machinery that is arranged to generate electricity from a flow of water entering the storage volume. The pumping machinery may be positioned at a greater water depth than the generating machinery.

The storage volume of the energy storage unit may be elongate, extending between groups of the set. Terminal structures at each end of the storage volume may conveniently house the pumping and generating machinery. In particular, the pumping machinery may be housed in a terminal structure at one end of the storage volume and the generating machinery may be housed in a terminal structure at an opposite end of the storage volume. In top plan view, each terminal structure is preferably located closer to a hub than the power producer units of a group comprising that hub. The energy storage unit suitably comprises at least one cable that effects electrical connection between the hubs of different groups of the set.

Wet-mate connections may be made between the pumping machinery, the generating machinery and umbilicals suspended from the hubs.

The hub of at least one group of the set may be configured to switch power generated by the power producer units of that group to drive the pumping machinery of the energy storage unit. Conversely, the hub of at least one group of the set may be configured to combine power generated by the power producer units of that group with power generated by the generating machinery of the energy storage unit.

The inventive concept also provides a set of floating electric power-generation groups each comprising a floating hub and a plurality of floating power producer units that are connected electrically to the hub.

The hub of at least one of the power-generation groups may be connected electrically to and configured to serve as an electrical substation for the hub of at least one other of the power-generation groups.

The power-generation groups of the set may be arranged in at least two rows including a first row and a second row. In this case the hub of at least one of the power-generation groups in the first row may be connected electrically to and configured to serve as an electrical substation for the hub of at least one of the power-generation groups in the second row.

Alternatively, the power-generation groups of the set may include a central power-generation group and an array of power-generation groups that at least partially surround the central power-generation group. In this case the hub of the central power-generation group may be connected electrically to and configured to serve as an electrical substation for the hub of at least one of the surrounding power-generation groups.

The hubs and/or power producer units of the power-generation groups may be connected to subsea foundations on the seabed. At least one of the power-generation groups may share at least one subsea foundation with at least one other of the power-generation groups.

Where the power-generation groups of the set are arranged in at least two rows, each of the power-generation groups may share at least one subsea foundation with at least one other power-generation group in its own row and at least one subsea foundation with at least one other power-generation group in another row.

Alternatively, where the power-generation groups of the set include an array of power-generation groups that at least partially surround a central power-generation group, the central power-generation group may share at least one subsea foundation with at least one of the surrounding power-generation groups, and preferably with each of the surrounding power-generation groups. The surrounding power-generation groups may each also share at least one subsea foundation with at least one other of the surrounding power-generation groups.

The inventive concept also extends to an offshore electric power-generation arrangement, comprising: a plurality of electric power-generation groups, each group comprising a hub that is connected electrically to a plurality of power producer units; and at least one subsea energy storage unit that electrically connects the hub of one of the groups to the hub of another of the groups.

Correspondingly, the inventive concept may be expressed as a method of generating electrical power offshore, which method comprises: generating electrical power using a plurality of electric power-generation groups, each group comprising a hub that is connected electrically to a plurality of power producer units; and conveying electrical power from the hub of one group to the hub of another group via at least one subsea energy storage unit. For example, electrical power may be converted to potential energy by pumping water from a storage volume of the subsea energy storage unit. Thereafter, the stored potential energy may be converted to recovered electrical power by admitting a flow of water back into the storage volume. Water may conveniently be pumped out of the storage volume at a greater depth than the depth at which water is admitted into the storage volume.

Embodiments of the invention provide a floating windfarm, comprising: a central buoyant hub anchored to the seabed by a plurality of mooring lines; and at least two floating wind turbines electrically connected to the central hub, and mechanically connected to the central hub by at least one radial mooring line; wherein the floating wind turbines are also anchored to the seabed by mooring lines, at least one of the wind turbine mooring lines being connected to a bottom section of a mooring line of the central hub. The mooring lines may, for example, comprise a combination of chains and/or spiral strand wire and/or synthetic wire.

The central hub may be a spar buoy or a platform, which may be anchored by catenary mooring legs or by taut tendons. For example, WO 2006/42178 shows a spar buoy and WO 97/45318 shows a tensioned leg platform.

The floating wind turbines may be at the same distance as each other from the central hub, for example distributed around the circumference of a circle centred on the hub.

The or each radial mooring line may be a catenary line between the wind turbine and the central hub or the upper third of a mooring line of the central hub.

The central hub is apt to carry a power substation or may export power to a subsea substation.

Thus, the inventive concept may be exemplified by arranging wind turbines in a circular configuration around a central tower or spar structure that serves as an interface with subsea infrastructure.

The invention is apt to accommodate very large-diameter offshore wind turbines as they become available. By employing proven spar or tower solutions, the invention can accommodate water depths of up to 3000 m. The invention also enables deep-water storage of electrical energy generated offshore, noting that high-voltage dynamic umbilicals are not practical with existing technology.

In summary, the invention provides a floating power-generation group that comprises a floating hub, such as a spar buoy, which is anchored to subsea foundations by anchor lines. Floating power producer units such as wind turbines are connected electrically and mechanically to the hub. The power producer units are each moored by mooring lines. At least one mooring line extends inwardly toward the hub to effect mechanical connection to the hub and at least one other mooring line extends outwardly toward a subsea foundation.

The groups may be combined as a set whose hubs are connected electrically to each other, for example via subsea energy storage units. Anchor lines of different groups can share subsea foundations. The storage units suitably comprise pumping machinery to expel water from an elongate storage volume such as a pipeline and generating machinery to generate electricity from a flow of water entering the storage volume. The pumping machinery may be in deeper water than the generating machinery.

In order that the invention may be more readily understood, reference will now be made, by way of example, to the accompanying drawings in which.

Figure 5:
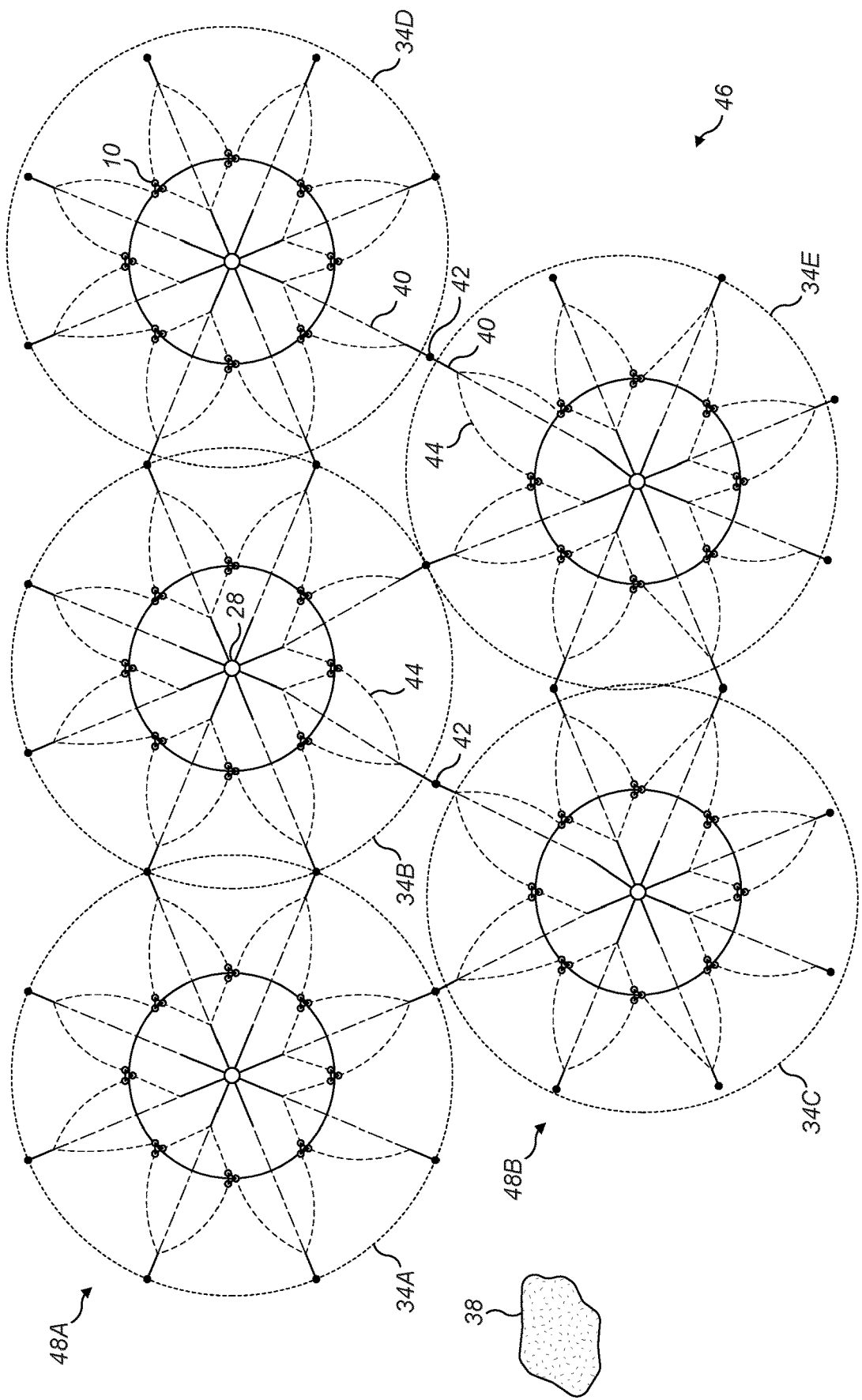
FIG. 5 is a schematic plan view of a set of the generating groups shown in FIG. 3, each comprising an array of wind turbine units centred on a respective spar buoy serving as a central hub.
Figure 7:
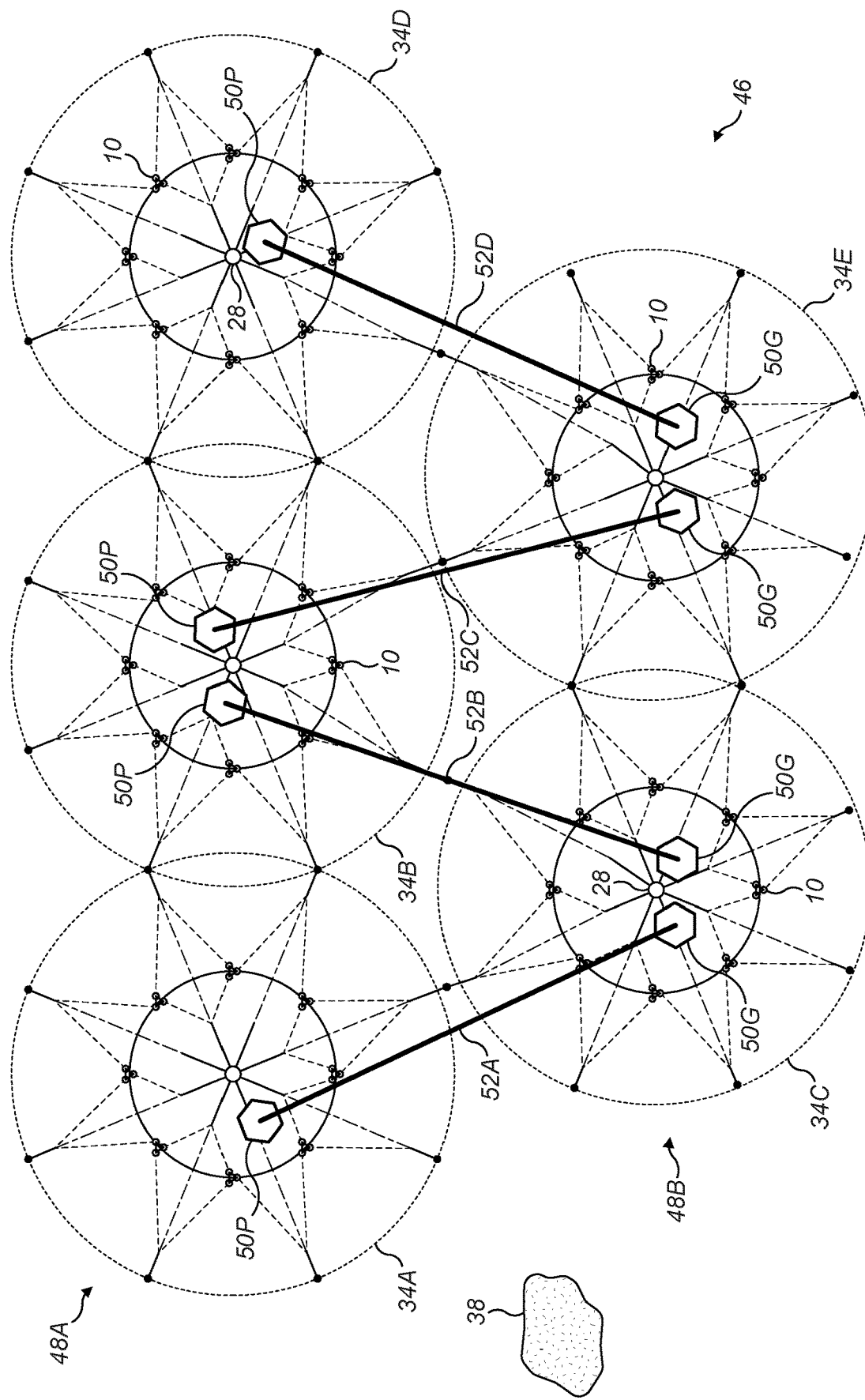
Figure 8:
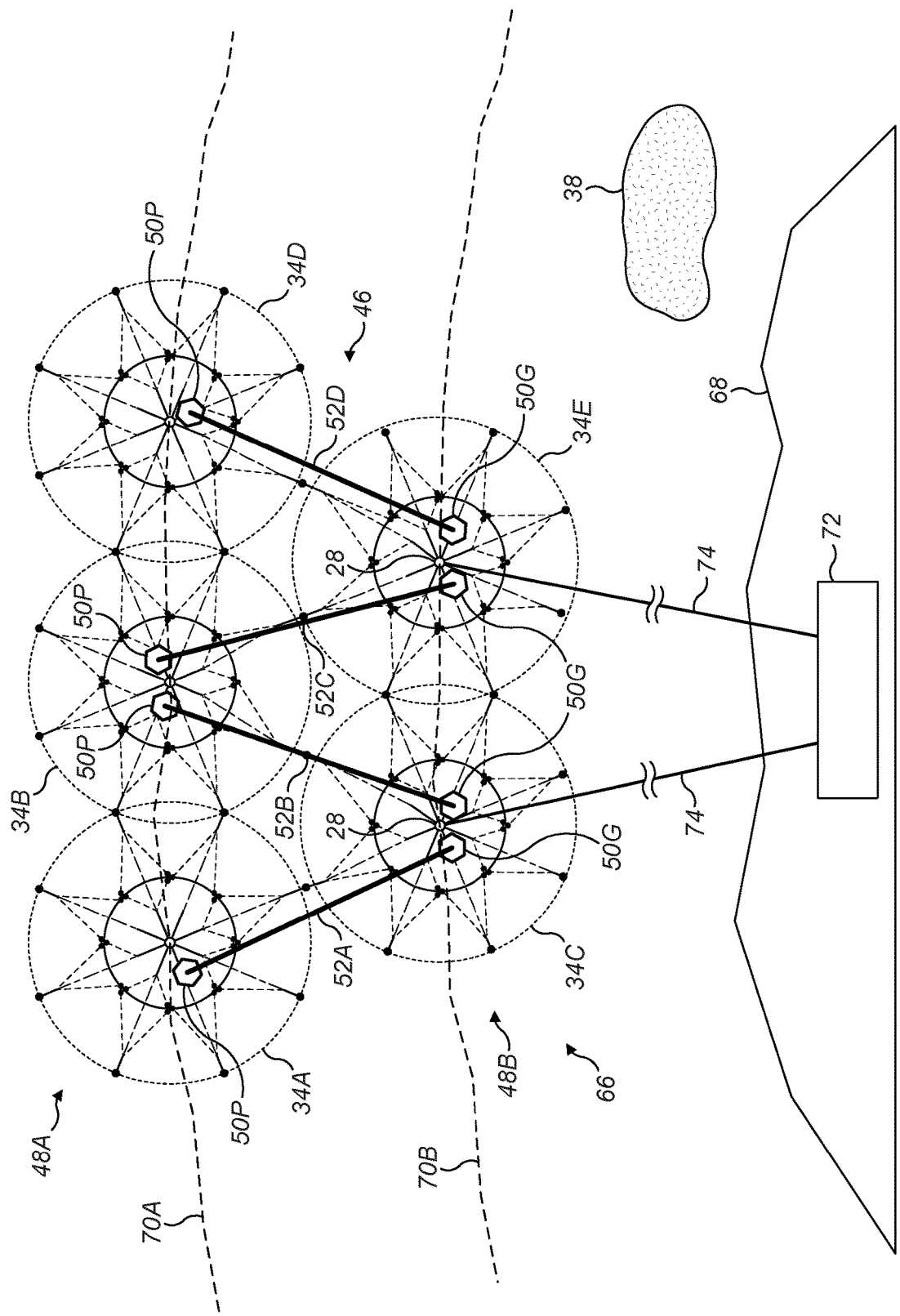
Figure 9:
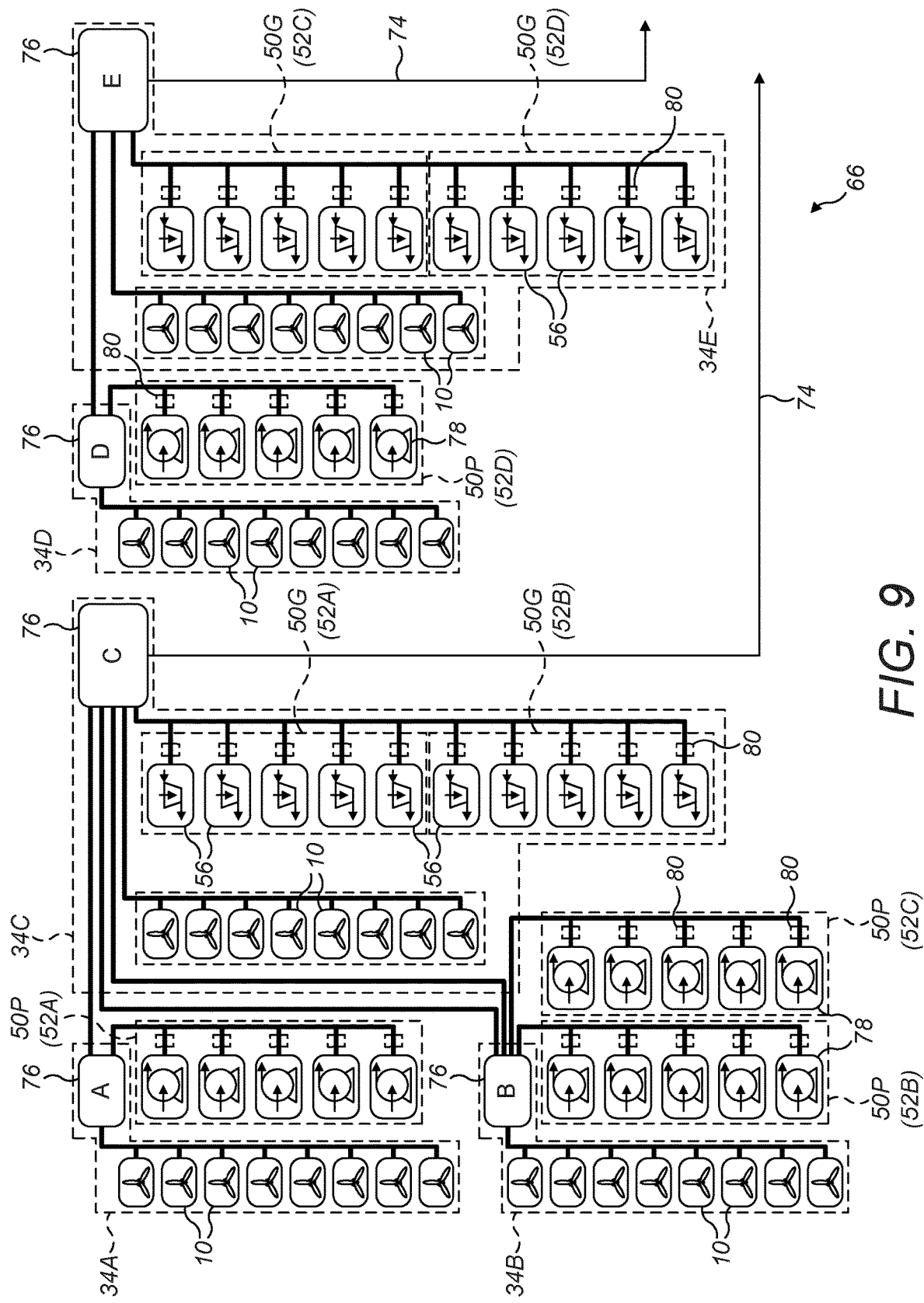
Figure 10:
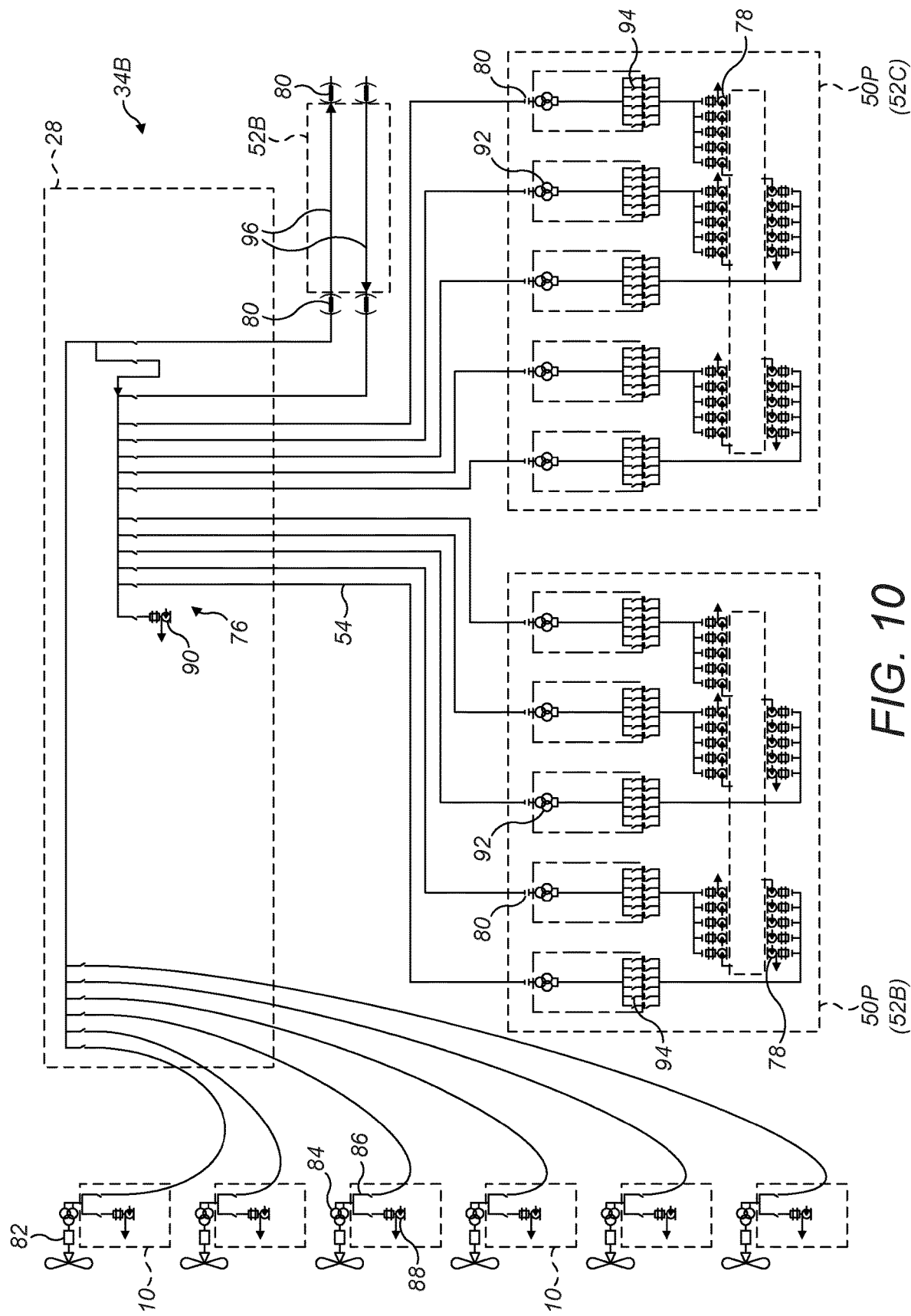
Figure 11:
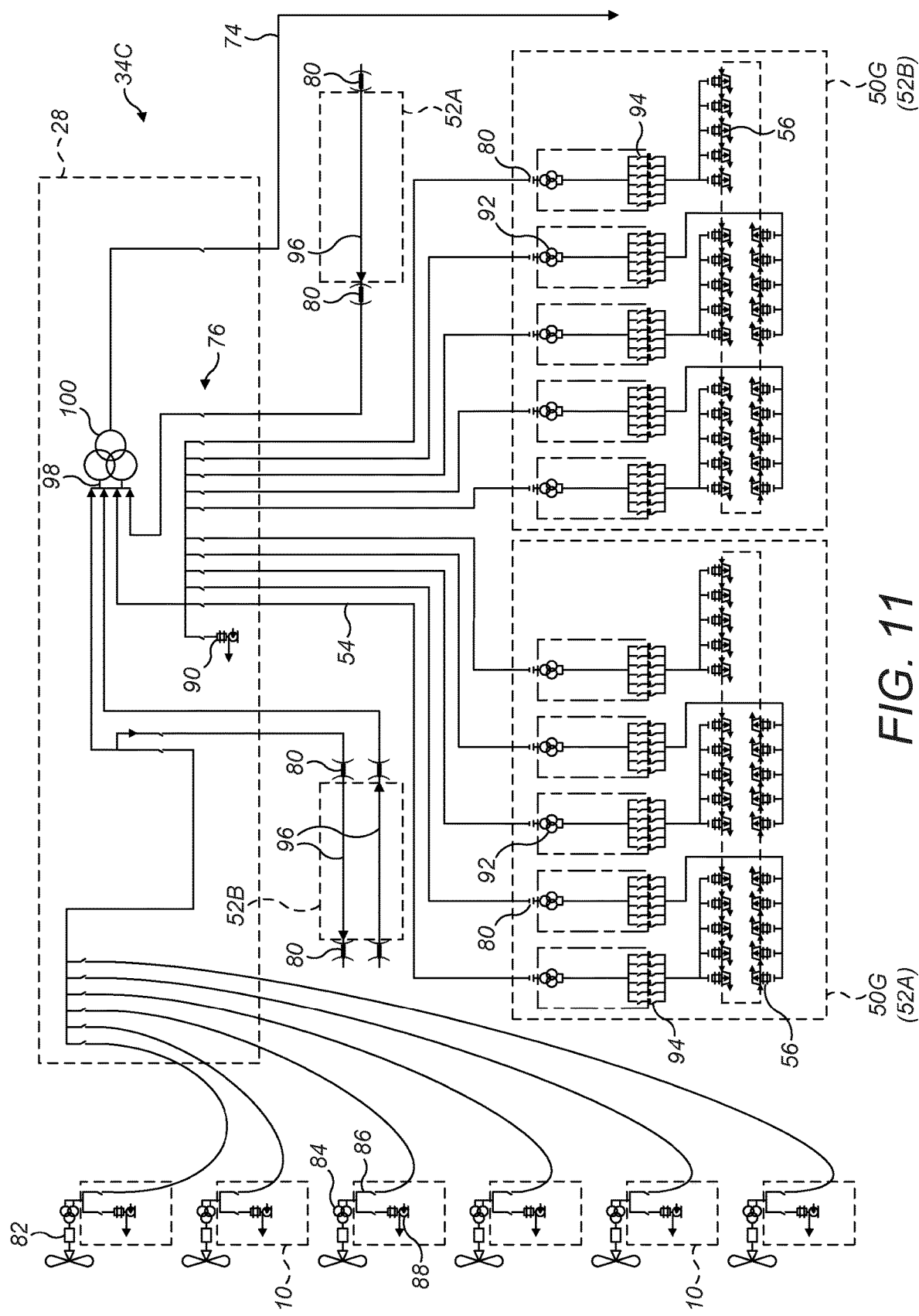
Figure 12:
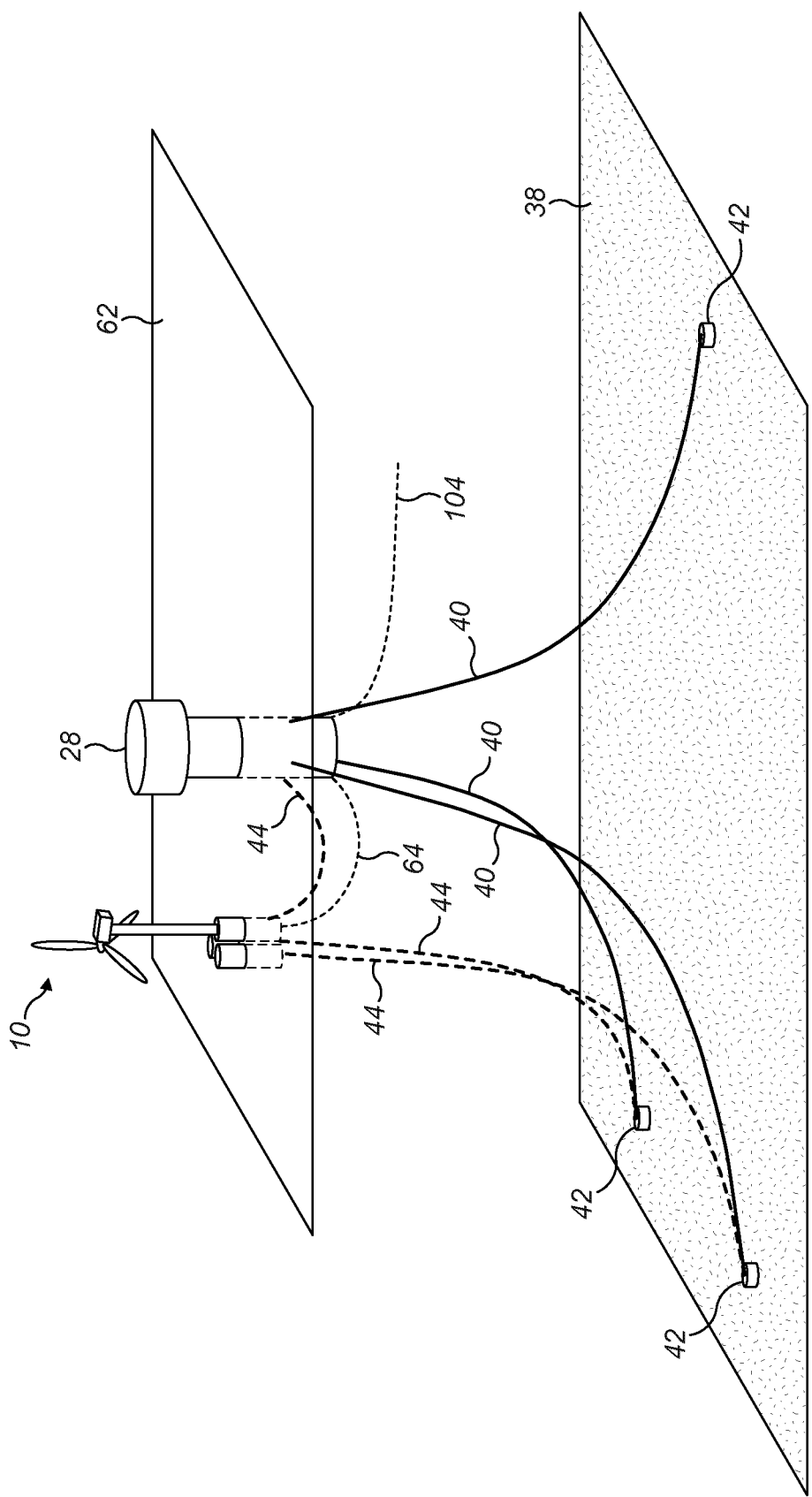
Figure 13:
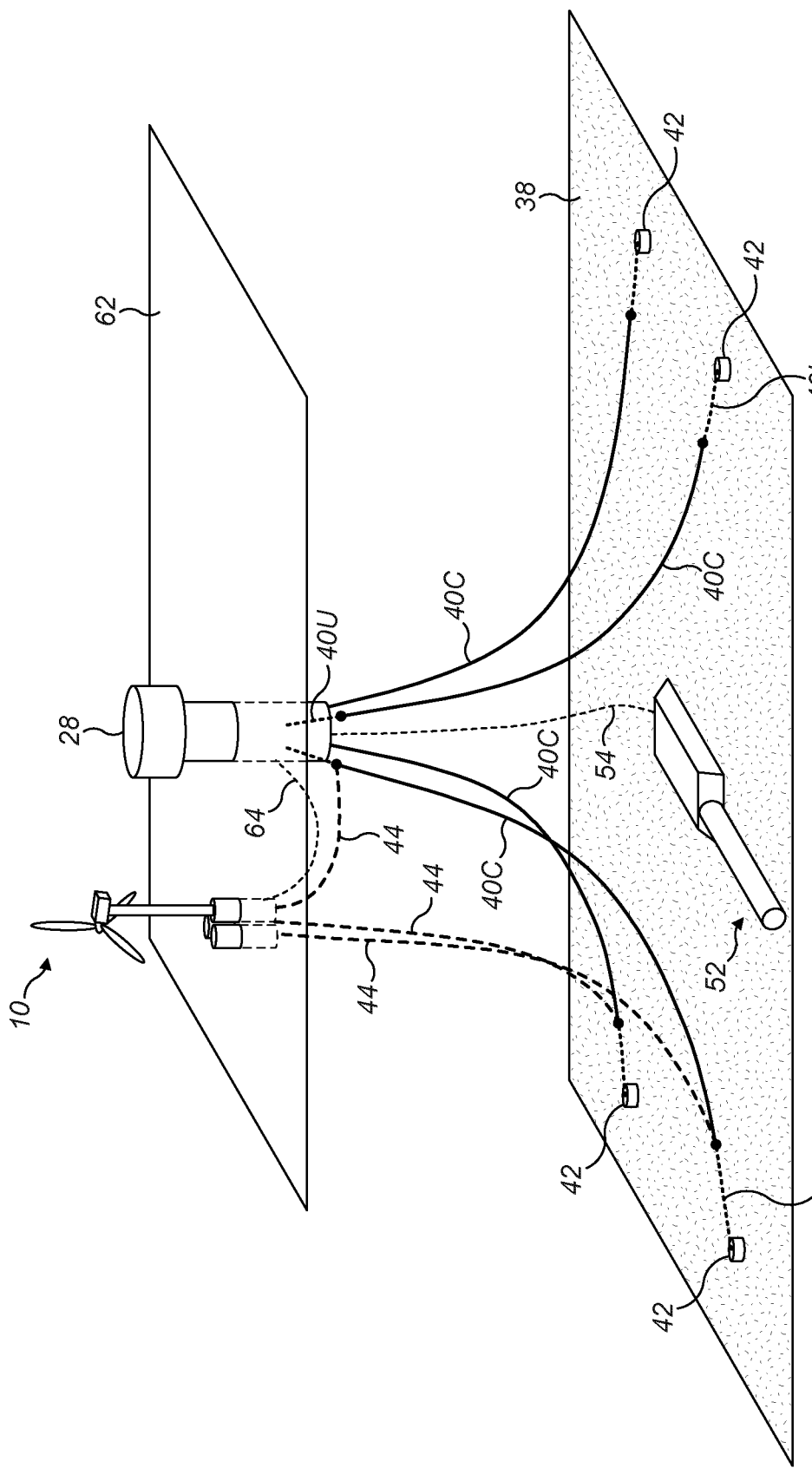
Figure 14:
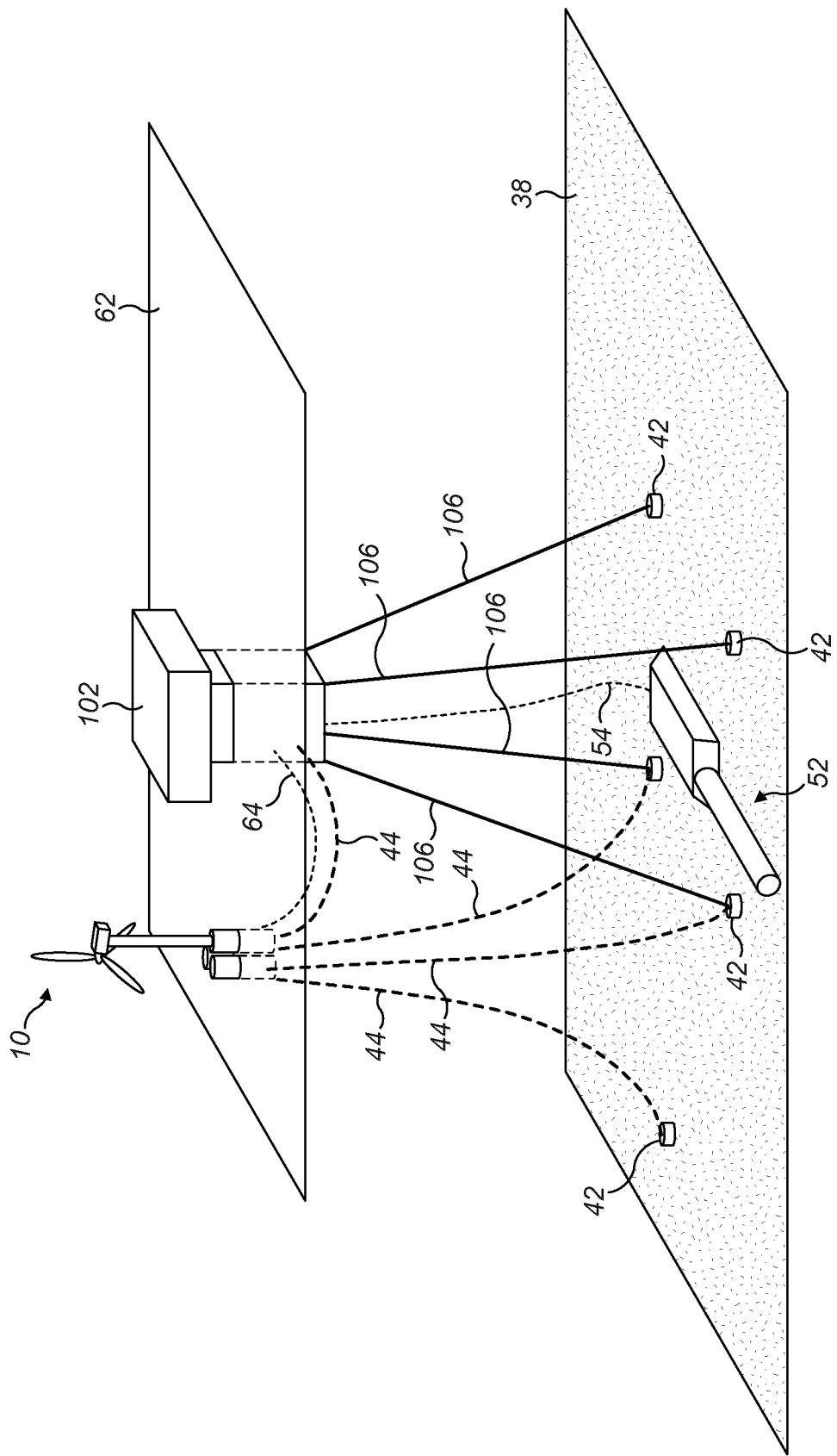
Figure 15:
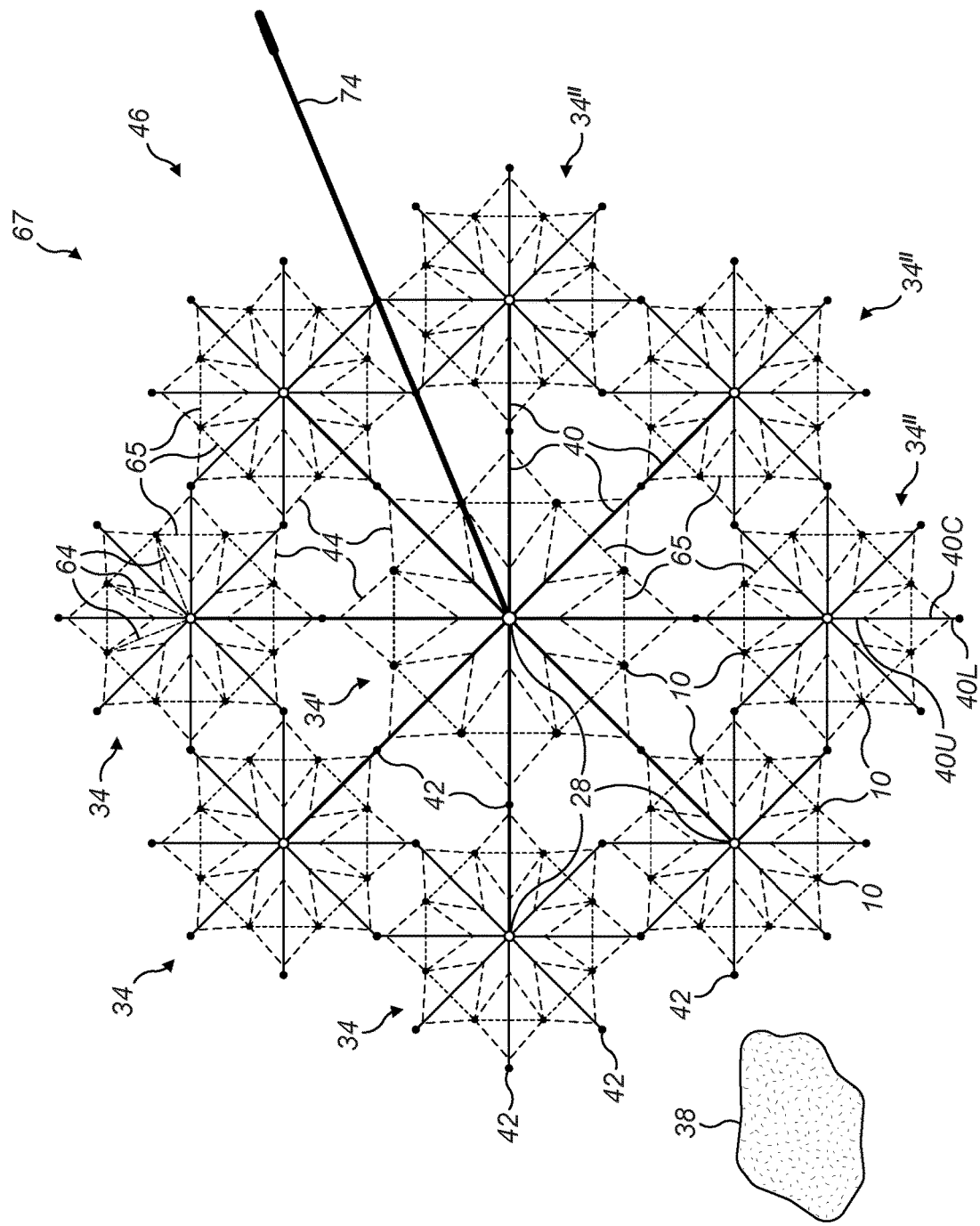
Figure 16:
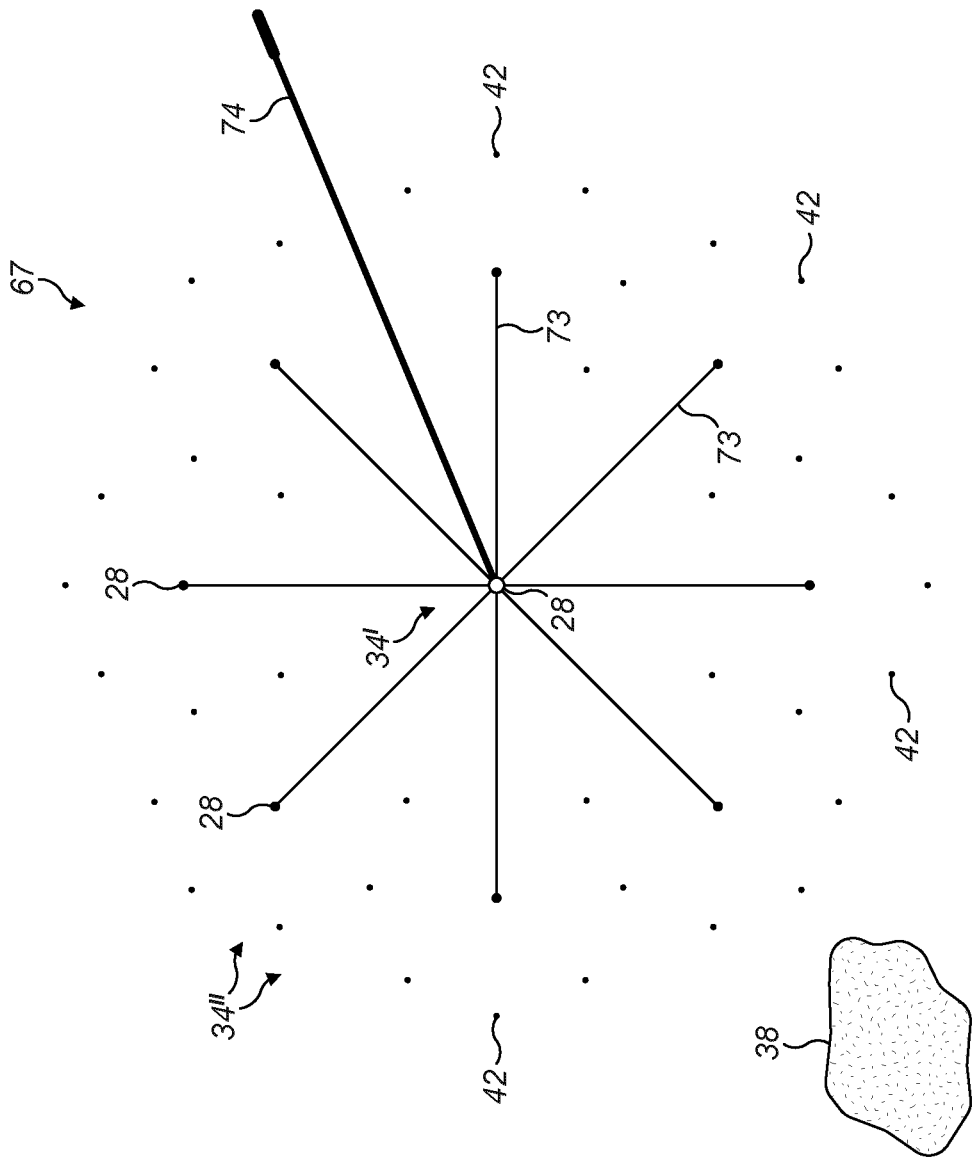

FIG. 7 corresponds to FIG. 5 but additionally shows energy storage bundles interconnecting the hubs of the set of generating groups;

FIG. 8 is a schematic plan view of set of generating groups shown in FIG. 7 connected to an onshore power grid;

FIG. 9 is an electrical block diagram showing the relationships between the arrays of wind turbine units, associated spar buoys and energy storage bundles of the set of generating groups shown in FIGS. 7 and 8;

FIG. 10 is an electrical system diagram showing electrical connections between the wind turbine units of one of the generating groups shown in FIG. 5, the associated spar buoy and the associated energy storage bundles;

FIG. 11 is an electrical system diagram showing electrical connections between the wind turbine units of another of the generating groups shown in FIG. 5, the associated spar buoy and the associated energy storage bundles, that spar buoy serving as a substation for other generating groups;

FIGS. 12 to 14 are schematic perspective views showing variants of mechanical and electrical connections between a wind turbine unit and a central hub; and FIGS. 15 and 16 are schematic plan views of a set of generating groups arranged in an alternative configuration to the configuration illustrated in FIGS. 5, 7 and 8.

Figure 1:
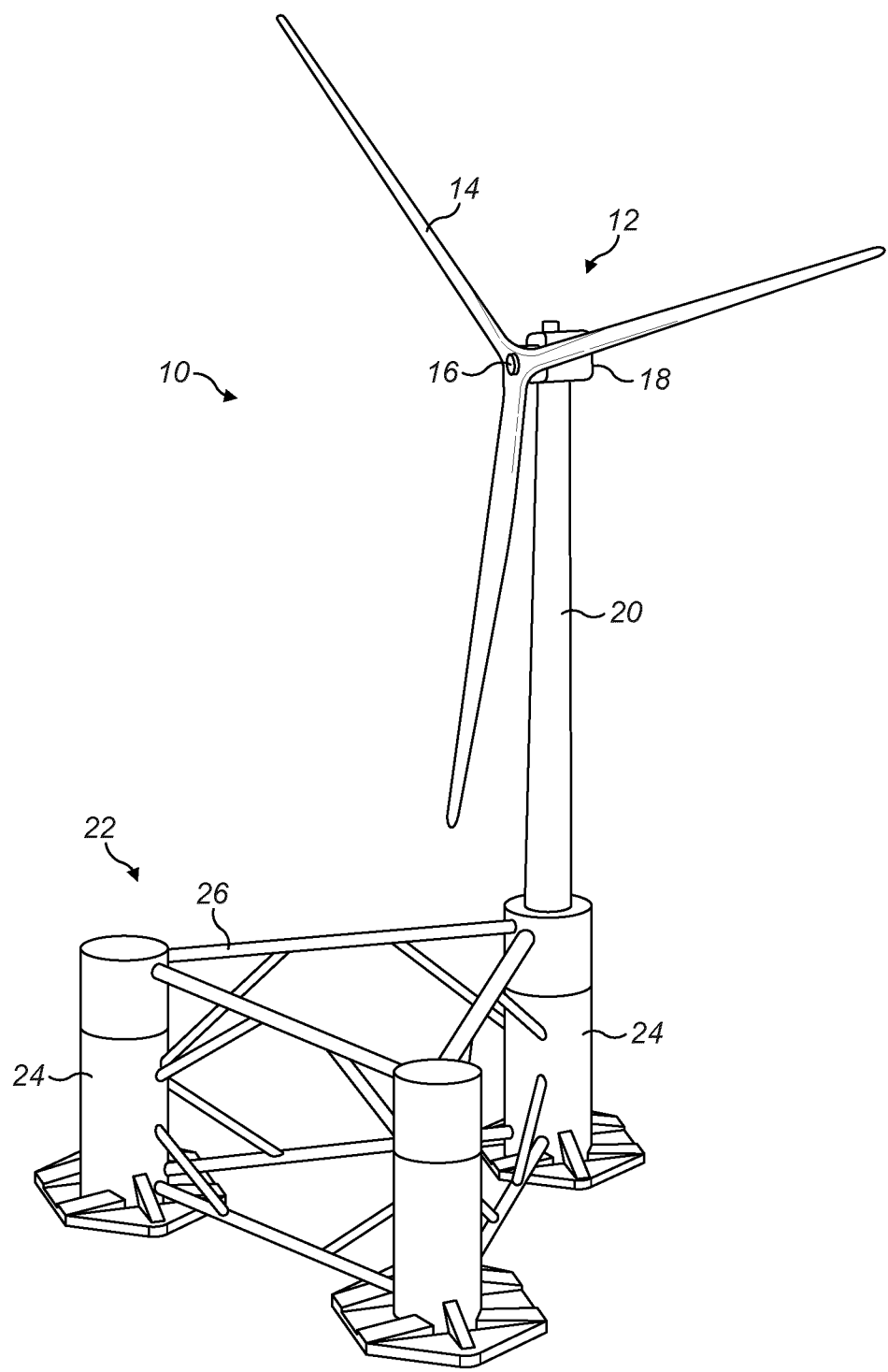
FIG. 1 is a perspective view of a floating wind turbine unit for use in the invention.

Referring firstly to the offshore floating wind turbine unit 10 shown in FIG. 1, a rotor of a wind turbine 12 comprises a set of blades 14 extending from a hub 16. The hub 16 turns relative to a nacelle 18 that contains power-generation machinery to be driven by the turning hub 16, including a gearbox and an electrical generator. As is conventional, the nacelle 18 is mounted atop a tower 20 and can turn relative to the tower 20 about an upright axis to align the blades 14 in accordance with the prevailing wind direction.

Whilst the wind turbine 12 shown in FIG. 1 is conventional in layout, the invention places no limits on the size of the turbine 12 and indeed enables the use of exceptionally large turbines 12 as they become available. Each turbine 12 could, for example, have a generating capacity of 12 MW. This implies that each blade 14 could have a length of about 100 m from the hub 16 to the tip, hence defining a rotor with a diameter of 200 m or more.

The turbine 12 is supported by a buoyant raft 22 that, in this example, comprises three parallel upright tubular legs 24 connected by a triangular lattice frame 26. The tower 20 of the turbine 12 extends upwardly and coaxially from one of the legs 24. The other two legs 24 contain ballast tanks to counter tilt forces arising from wind acting on the turbine 12. One of the three legs 24, which may be the leg 24 that supports the tower 20, houses switchgear controls and ballast pumps.

The turbine 12 and the raft 22 are apt to be fabricated, assembled and tested on shore or near shore, for example in a dry dock. The turbine 12 and the raft 22 may then be towed out together to, or reassembled at, an offshore windfarm site.

Figure 2:
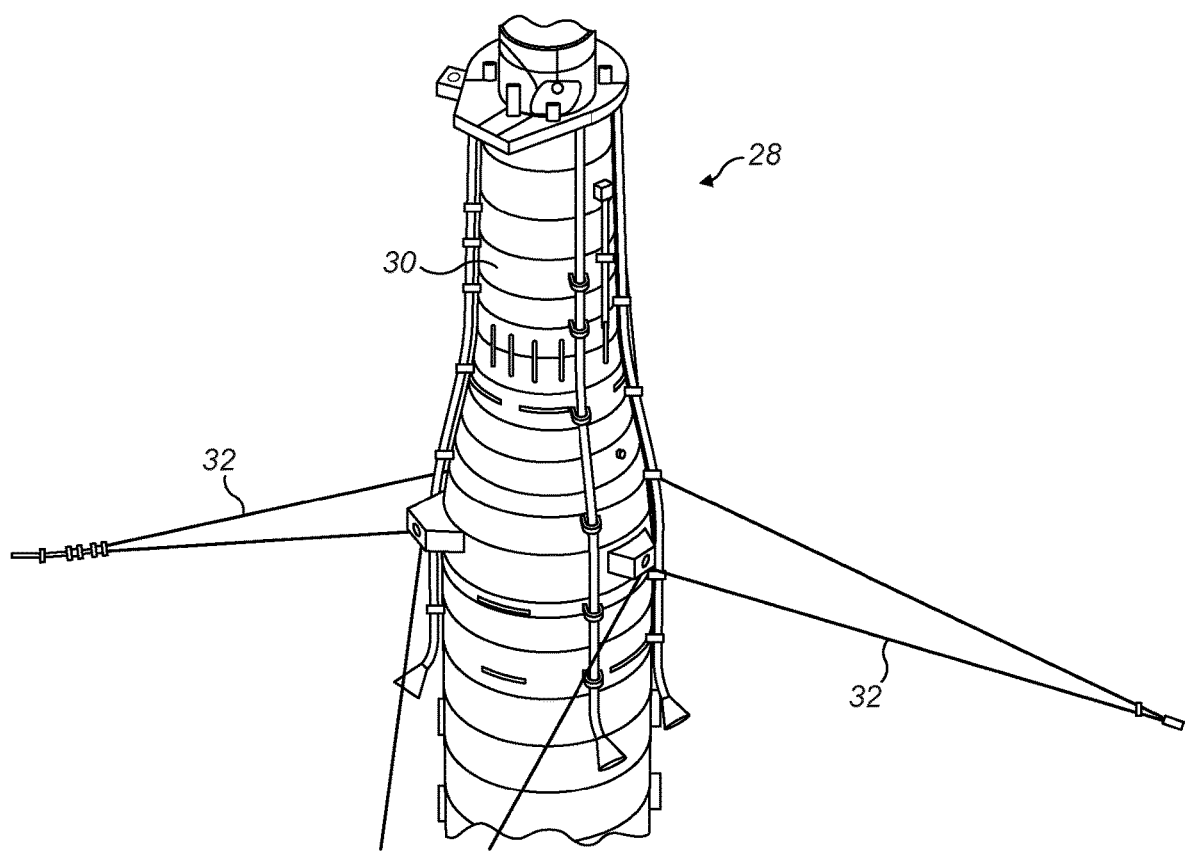
FIG. 2 is a perspective view of a spar buoy for use in the invention.

FIG. 2 shows a spar buoy 28 that exemplifies a floating hub for use in the invention. The spar buoy 28 comprises an upright cylindrical hull 30 that is characterised by its tall and narrow profile. Mooring lines 32 radiate from the hull 30 equi-angularly as shown; there may be more or fewer such mooring lines 32. Again, conveniently, the components of the spar buoy 28 could be fabricated and assembled in a dry dock.

As will be explained, the floating hub of the invention could be defined by a buoyancy-supported structure other than a spar buoy 28, such as a tower or a tension leg platform (TLP).

Advantageously, the spar buoy 28 or other floating hub houses high-voltage equipment in a dry environment, thereby avoiding the need for such equipment to be positioned subsea and especially in deep water. An example of high-voltage equipment is a boost transformer and its associated switchgear. As will be explained, a boost transformer may be used to raise generation voltage from, say, 6.6 kV to a transmission voltage of, say, 132 kV for export of electrical power to an onshore grid.

The use of a spar buoy 28 or other floating hub employs existing, proven technology to minimise vertical and horizontal movement under the action of wind, waves and currents when installed offshore in deep water. This enables the use of static riser elements to convey electrical power and also avoids the limitations of high-voltage dynamic umbilicals, for which the current maximum depth limit is regarded as being around 200 m. In particular, the invention mitigates the problem of designing deep-water high-voltage dynamic umbilicals by reducing dynamic motions and associated stresses.

A spar buoy 28 or other floating hub has various other advantages. For example, it enables various dynamic umbilicals of the system to have standardised cross-sections, which reduces engineering costs and minimises the need for spares. In this respect, the spar buoy 28 or other floating hub may be configured for conventional pull-in and dry termination of umbilicals and risers using a central pull-in arrangement. Tie-in of umbilicals and risers during installation can therefore be achieved with a low-specification vessel that is less expensive and that has greater availability than a higher-specification vessel. Widening the range of available installation vessels is a particular benefit for installation in remote areas.

Figure 3:
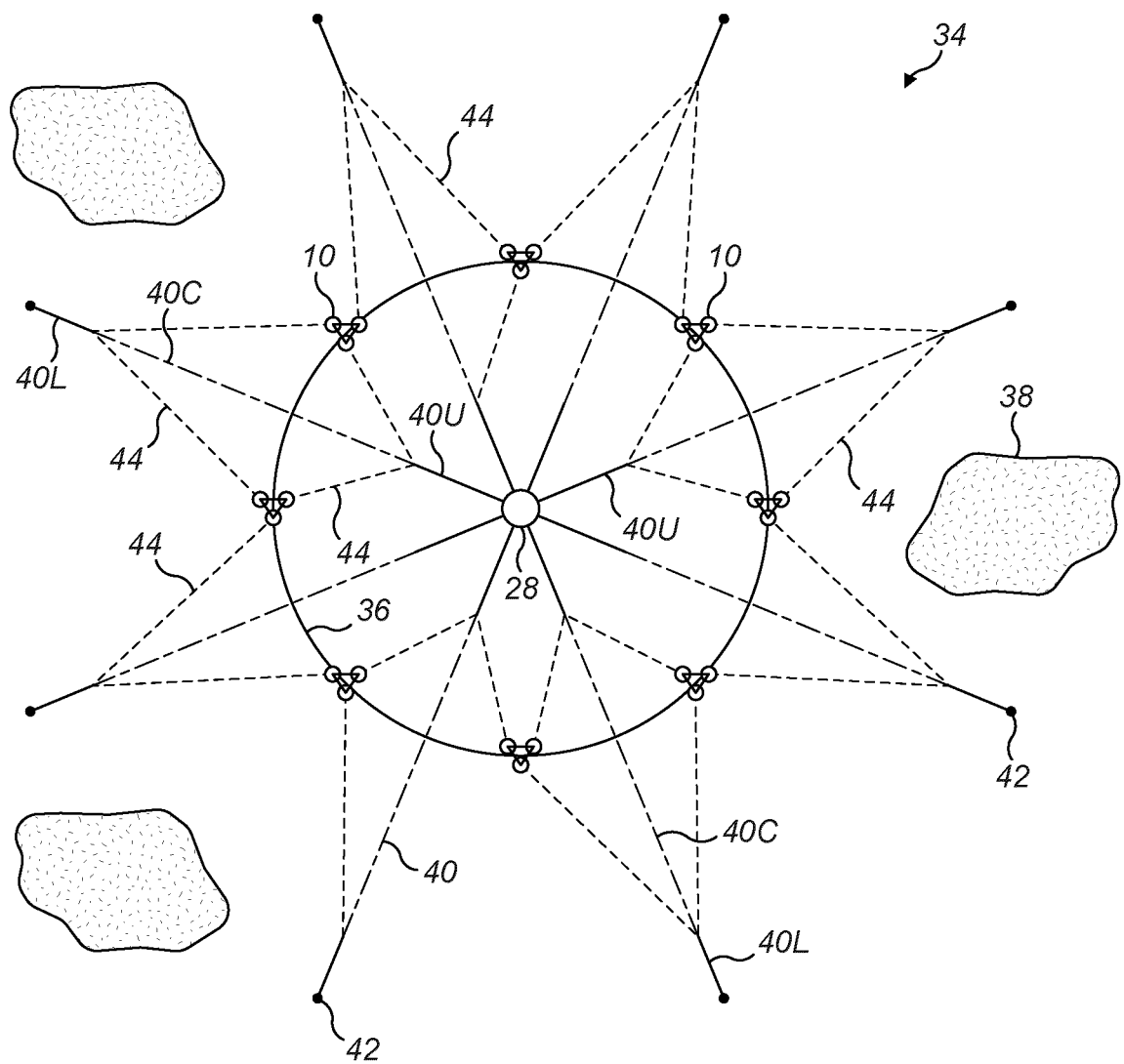
FIG. 3 is a plan view of a generating group comprising a circular array of wind turbine units of FIG. 1 surrounding a central hub exemplified by the spar buoy of FIG. 2.

Turning next to FIG. 3, this plan view shows a generating group 34 in which a spar buoy 28, such as that shown in FIG. 2, serves as a central hub for a circular array of wind turbine units 10 that are centred on that hub. In each wind turbine unit 10, a turbine 12 floats on a buoyant raft 22 as shown in FIG. 1. In this example, the generating group 34 comprises eight wind turbine units 10 that are equi-angularly spaced on a pitch circle 36 with the spar buoy 28 at its centre.

The optimal mutual spacing between the wind turbine units 10 is based upon the rotor diameters of their turbines 12 and is determined by the effects of turbulence between the rotating blades 14 of adjacent turbines 12. If the turbines 12 are too close to each other, this could result a reduction of between 5% and 8% in the overall power generated by the installation.

Assuming eight 12 MW turbines 12 each with a rotor diameter of 200 m, the pitch circle 36 has a diameter of 2200 m around the central hub defined by the spar buoy 28. This reflects optimal spacing between the turbines 12, regarded as a minimum of seven rotor diameters in line with the principal expected wind direction and four rotor diameters between adjacent turbines 12 in a direction transverse to that wind direction.

In the anchor pattern arrangement of the generating group 34 shown in FIG. 3, the spar buoy 28 is moored to the seabed 38 by hub anchor lines 40 that hang from the spar buoy 28 as taut legs or catenaries and that extend radially from the spar buoy 28 in plan view. A subsea foundation 42 placed on or embedded in the seabed 38, such as a suction pile, serves as an anchor at the outer end of each hub anchor line 40. In this example, each subsea foundation 42 may be positioned at a radius of about 3000 m from the vertical centre line of the spar buoy 28. Thus, the hub anchor lines 40 extend radially beyond the pitch circle 36 on which the wind turbine units 10 are positioned.

In this example, the hub anchor lines 40 are equal in number to the wind turbine units 10. Consequently, there are eight hub anchor lines 40. In plan view, each wind turbine unit 10 is interposed between an adjacent pair of hub anchor lines 40 such that the wind turbine units 10 and the hub anchor lines 40 alternate with each other, moving circumferentially around the spar buoy 28.

Most of the length of each hub anchor line 40 comprises an intermediate central section 40C that may be made of steel wire or, preferably, a synthetic rope of a polymer such as polyester. Each hub anchor line 40 further comprises upper and lower sections 40U, 40L that are suitably made of steel chain for wear resistance. The upper section 40U extends from the central section 40C to the spar buoy 28. The lower section 40L extends from the central section 40C to the associated subsea foundation 42. Where the foundation 42 is embedded in the seabed 38, part of the lower section of the hub anchor line 40 may also be embedded in the seabed 38.

Each wind turbine unit 10 is moored, in turn, by a set of turbine mooring lines 44 in the form of taut legs or catenaries. Again, all or most of the turbine mooring lines 44 may be made of steel wire or of a synthetic rope of a polymer such as polyester.

In the example shown in FIG. 3, a set of three turbine mooring lines 44 extends from the raft 22 of each wind turbine unit 10 to adjacent hub anchor lines 40 disposed on both sides of that wind turbine unit 10. In most cases, two of the turbine mooring lines 44 extend from the wind turbine unit 10 in a radially-outward direction and one of the turbine mooring lines 44 extends from the wind turbine unit 10 in a radially-inward direction with respect to the spar buoy 28. However, FIG. 3 also shows the option of one of the turbine mooring lines 44 extending from the wind turbine unit 10 in a radially-outward direction and two of the turbine mooring lines 44 extending from the wind turbine unit 10 in a radially-inward direction with respect to the spar buoy 28.

Figure 4:
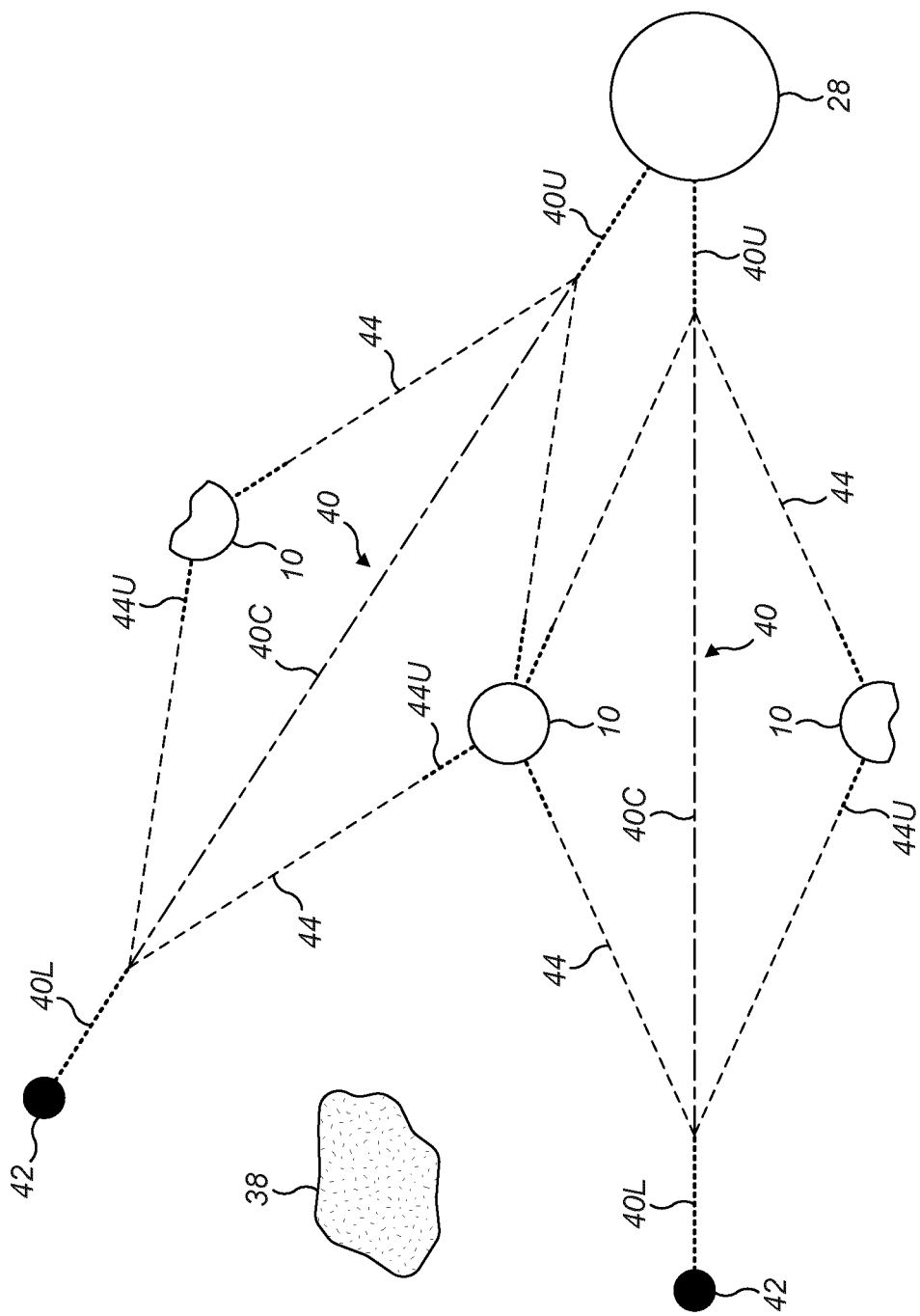
FIG. 4 is an enlarged schematic detail plan view showing alternative mechanical connections between the spar buoy and the wind turbine units.

In the variant shown in FIG. 4, a set of four turbine mooring lines 44 extends from the raft 22 of each wind turbine unit 10 to adjacent hub anchor lines 40 on both sides of that wind turbine unit 10. A first pair of those turbine mooring lines 44 extends from the wind turbine unit 10 in a radially-outward direction and a second pair of those turbine mooring lines 44 extends from the wind turbine unit 10 in a radially-inward direction with respect to the spar buoy 28.

In the examples of FIGS. 3 and 4, each of the turbine mooring lines 44 intersects the respective hub anchor line 40 at a junction between the central section 40C and the lower section 40L of the hub anchor line 40 or at a junction between the central section 40C and the upper section 40U of the hub anchor line 40. Thus, each turbine mooring line 44 may be joined to a respective hub anchor line 40 by a coupling at the top of the lower section 40L or at the bottom of the upper section 40U of the hub anchor line 40. In this way, elegantly, the turbine mooring line 44 and the hub anchor line 40 share a common subsea foundation 42 and the upper and/or lower sections 40U, 40L may be shared by the turbine mooring line 44 and the hub anchor line 40. FIG. 4 also shows that each turbine mooring line 44 may have an upper section 44U of chain adjoining the associated wind turbine unit 10.

Moving on to FIG. 5, this shows a set 46 of generating groups 34 like that shown in FIG. 3, each generating group 34 comprising a circular array of wind turbine units 10 centred on a respective spar buoy 28 serving as a central hub for the array. In this example, the set 46 comprises five such generating groups 34 in two mutually-staggered rows 48, a first row 48A comprising three generating groups 34 denoted 34A, 34B and 34D and a second parallel row 48B comprising two generating groups 34 denoted 34C and 34E. Elegantly, this arrangement allows generating groups 34 of one row 48 to share subsea foundations 42 of neighbouring generating groups 34 of the other row 48, which foundations 42 serve as anchors for the spar buoys 28 of the respective generating groups 34. Those shared foundations 42 are disposed between the rows 48 as shown.

As the turbine mooring lines 44 share the hub anchor lines 40 via link interfaces, and as at least some of the foundations 42 are also shared between hub anchor lines 40, the installation requires fewer deep-water anchors. This beneficially declutters the seabed 38 and helps to protect the installation from fishing or other marine activities. A further benefit of this arrangement is to make space for terminal modules such as towheads 50 of energy storage bundles 52 to be located on the seabed 38 within the anchor pattern, as shown in FIGS. 6 and 7.

Figure 6:
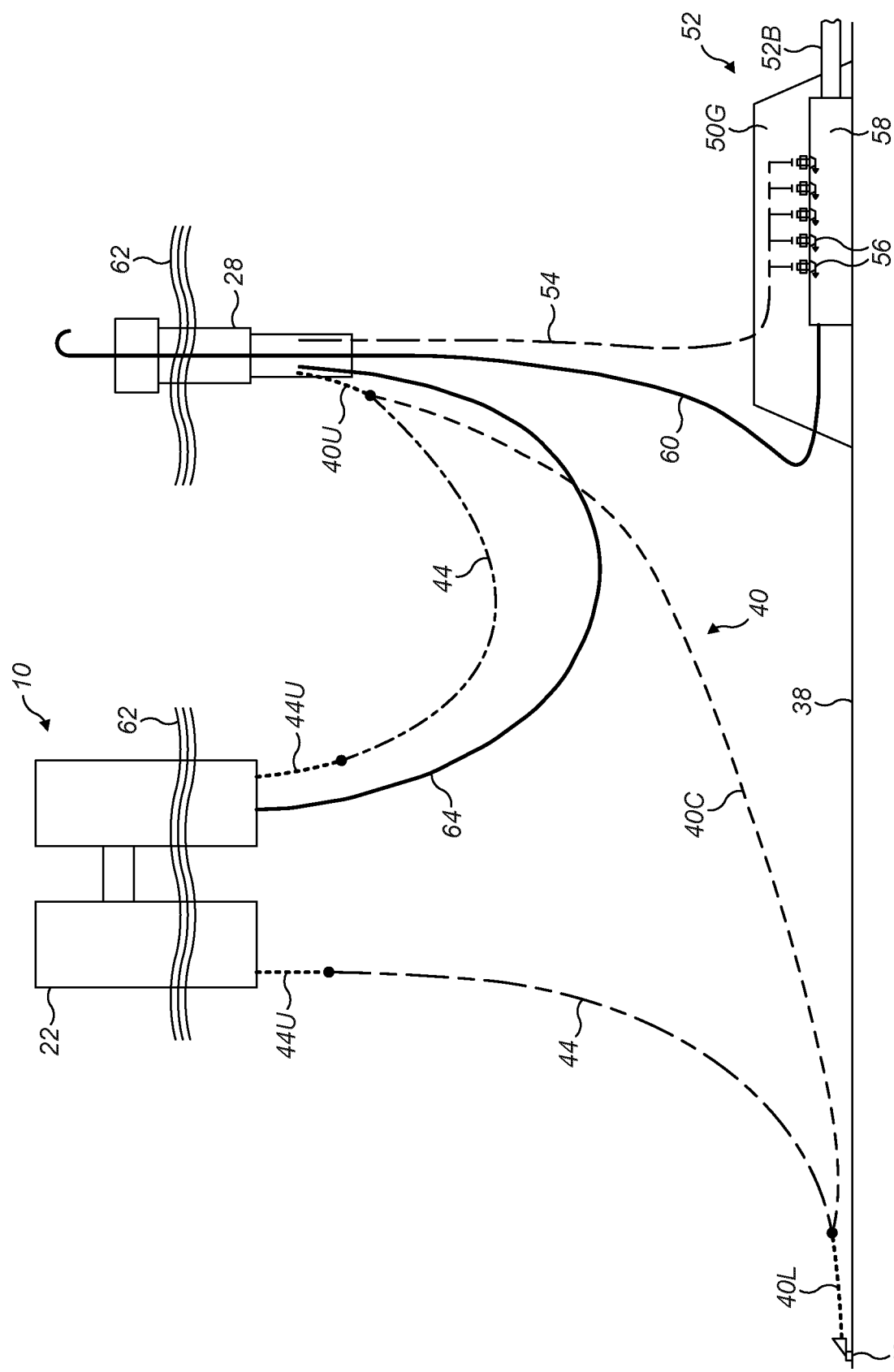
FIG. 6 is a schematic side elevation view showing mechanical connections between the spar buoy and one of the wind turbines of the generating group shown in FIG. 3, and also showing electrical connections to a subsea energy storage bundle.

In this respect, FIGS. 6 and 7 show elongate energy storage bundles 52 that terminate in towheads 50 within the anchor pattern of each generating group 34. Such energy storage bundles 52 may employ the principles described in WO 2019/043105, which discloses a pumped-storage system having pumping and hydropower generation components for, selectively, converting electricity into potential energy by expelling water from within a tank into the surrounding sea and for generating electricity from an incoming flow of water re-entering the tank under hydrostatic pressure. The tank comprises at least one elongate rigid pipeline that may be lowered to the seabed 38 as part of a towable unit or laid on the seabed 38 as a pipe string launched from a surface vessel.

Conveniently, in the example shown in FIGS. 6 and 7, each energy storage bundle 52 comprises: a pumping towhead 50P that supports a set of pumps for expelling water; a generating towhead 50G that supports a set of turbo-generator units comprising water turbines for generating electricity from an incoming flow of water, and an intermediate bundle of pipelines that together define a tank or power storage volume and establish fluid communication between the pumping towhead 50P and the generating towhead 50G. The pumping towhead 50P of each energy storage bundle 52 is electrically connected to and configured to be powered by the spar buoy 28 of a respective one of the generating groups 34 when water is to be expelled from the energy storage bundle 52 via the pumping towhead 50P. The generating towhead 50G of each energy storage bundle 52 is electrically connected to and configured to transmit power generated by its turbo-generator units to the spar buoy 28 of another one of the generating groups 34 when water is allowed to flow back into the energy storage bundle 52 via the generating towhead 50G.

For example, electricity may be generated in a subsea pumped-storage system by employing the principles described in UK Patent Application GB257847:3, which discloses an underwater turbo-generator unit that comprises a pressure-resistant shell defining a sealed internal chamber. At least one water inlet extends through the shell to effect fluid communication between the chamber and the sea surrounding the shell. A turbine is supported within the chamber to turn on a spin axis in response to admission of a flow of water into the chamber via the or each water inlet. The shell may be arranged to maintain a gas-filled space within the chamber, facilitating the use of a Pelton turbine that turns about a vertical spin axis. The chamber communicates with, and drains water into, a fluid storage volume such as a pipeline or bundle positioned at a level beneath the chamber.

FIG. 6, which is not to scale, shows a generating towhead 50G at an end of an energy storage bundle 52 lying on the seabed 38. The towhead 50G is conveniently close to the vertical central longitudinal axis of the spar buoy 28, and indeed in this example is directly beneath the spar buoy 28. A power umbilical 54 hangs from the spar buoy 28 to make electrical connections between electrical equipment on the spar buoy 28 and a set of turbo-generator units 56 within the towhead 50G. The towhead 50G further includes a drainage void or chamber 58 beneath the turbo-generator units 56 that communicates with the bundle of pipelines 52B extending between the towheads 50P, 50G. A dynamic breather pipe 60 for allowing air to enter the energy storage bundle 52 as water is being expelled by the pumping towhead 50P and to leave the energy storage bundle 52 as water enters the energy storage bundle 52 via the generating towhead 50G extends from the chamber 58 to the atmosphere above the surface 62 and is conveniently supported by the spar buoy 28.

A further dynamic power umbilical 64 hangs as a catenary between the raft 22 of the wind turbine unit 10 and the spar buoy 28. FIG. 6 also shows the hub anchor line 40, comprising a central section 40C of synthetic rope and upper and lower sections of chain 40U, 40L, hanging as a taut leg or catenary between the spar buoy 28 and a subsea foundation 42 on the seabed 38, and two of the turbine mooring lines 44 that hang as taut legs or catenaries from the raft 22 of the wind turbine unit 10. Each turbine mooring line 44 comprises an upper section 44U of chain fixed to the wind turbine unit 10.

One of the turbine mooring lines 44 extends from the wind turbine unit 10 radially inwardly, with respect to the spar buoy 28, to the junction between the central section 40C and the upper section 40U of the hub anchor line 40. The other of the turbine mooring lines 44 extends from the wind turbine unit 10 radially outwardly, with respect to the spar buoy 28, to the junction between the central section 40C and the lower section 40L of the hub anchor line 40.

By way of example, the top of the hub anchor line 40 may be at a depth of about 50 m beneath the surface 62 and the tops of the turbine mooring lines 44 may be at a depth of about 40 m beneath the surface 62. Conversely, the seabed 38 may be at a depth of several hundred metres, for example 600 m to 1000 m or more.

FIG. 7 corresponds to FIG. 5 but shows four energy storage bundles 52 that extend between, and connect respective pairs of, the five generating groups 34. The pumping towheads 50P of the energy storage bundles 52 are adjacent to the spar buoys 28 of the first row 48A of generating groups 34A, 34B and 34D. Conversely, the generating towheads 50G of the energy storage bundles 52 are adjacent to the spar buoys 28 of the second row 48B of generating groups 34C and 34E.

Specifically:
 a first energy storage bundle 52A extends from generating group 34A to generating group 34C;
 a second energy storage bundle 52B extends from generating group 34B to generating group 34C;

a third energy storage bundle 52C extends from generating group 34B to generating group 34E; and a fourth energy storage bundle 52D extends from generating group 34D to generating group 34E.

It will be noted that the towheads 50 of the energy storage bundles 52 are disposed close to the vertical longitudinal axes of the spar buoys 28 at the centres of the generating groups 34 and indeed may, as shown in FIG. 6, lie directly beneath the spar buoys 28.

Conveniently, the energy storage bundles 52 are apt to be used not only for energy storage but also to effect subsea electrical connections between the spar buoys 28 of the rows 48 of generating groups 34. For example, the spar buoys 28 of the first row 48A of generating groups 34 may conveniently serve as substations for the spar buoys 28 of the second row 48B of generating groups 34, with the first energy storage bundle 52A providing an electrical connection between the spar buoy 28 of generating group 34A and the spar buoy 28 of generating group 34C, the second energy storage bundle 52B providing an electrical connection between the spar buoy 28 of generating group 34B and the spar buoy 28 of generating group 34C and so on.

It will be apparent that the three generating groups 34A, 34B and 34D of the first row 48A provide for generation of power via their wind turbine units 10 and also for consumption of power via the pumps in the pumping towheads 50P of the associated energy storage bundles 52. In other words, the three generating groups 34A, 34B and 34D together provide a focal point for generation of electricity, effected by conveying their electrical output to the substations provided by the two generating groups 34C and 34E of the second row 48B, or for energy storage, effected by switching their output to the pumps that consume that electrical output and convert it to potential energy.

Conversely, the two generating groups 34C and 34E of the second row 48B provide for generation of power via their wind turbine units 10 and also via the turbo-generator units 56 in the generating towheads 50G of the associated energy storage bundles 52. The generating groups 34C and 34E also provide for switching their output either to an onshore power grid or to the pumps of the pumping towheads 50P that are located among the generating groups 34A, 34B and 34D.

FIG. 8 shows the set 46 of generating groups 34 situated offshore as part of a floating windfarm 66, in which the rows 48 of generating groups 34 within the set extend generally parallel to a coastline 68. A sloping seabed 38 shelving steeply away from the coastline is represented here by contour lines 70. One contour line 70A representing a water depth of, for example, 800 m extends through the three generating groups 34A, 34B and 34D of the first row 48A further from the coastline 68. The other contour line 70B representing a water depth of, for example, 600 m extends through the two generating groups 34C and 34E of the second row 48B closer to the coastline 68. Thus, efficiently, the pumping towheads 50P of the energy storage bundles 52 are at a greater water depth than the generating towheads 50G of the energy storage bundles 52.

In this example, the spar buoys 28 of the two generating groups 34C and 34E of the second row 48B serve as substations for the three generating groups 34A, 34B and 34D of the first row. The two spar buoys 28 that serve as substations are connected to an onshore power grid 72 by respective high-voltage links 74 that cross the coastline 66. The high-voltage links 74 are suitably located underwater and may, on land, be located underground.

Turning next to FIGS. 9 to 11, these drawings exemplify the electrical distribution system of the windfarm 66 shown in FIG. 8.

In the electrical block diagram of FIG. 9, the generating groups 34A, 34B, 34C, 34D and 34E each comprise an array of eight wind turbine units 10 connected to associated switchgear 76 housed in the respective spar buoys 28. Dry splice connections are made between the wind turbine units 10 and the switchgear 76, which are all topside above the surface 62 or at least are housed in a dry environment.

The switchgear 76 of generating groups 34A and 34B is connected, via the first and second energy storage bundles 52A and 52B, to the switchgear 76 of generating group 34C, which serves as a substation for generating groups 34A and 34B. Conversely, the switchgear 76 of generating group 34D is connected, via the fourth energy storage bundle 52D, to the switchgear 76 of generating group 34E, which serves as a substation for generating group 34D.

The switchgear 76 of generating groups 34A, 34B and 34D is also connected to respective sets of pumps 78, serving as subsea power consumers, located in the pumping towheads 50P of the associated energy storage bundles 52. Specifically, the switchgear 76 of generating group 34A is connected to the pumping towhead 50P of the first energy storage bundle 52A. The switchgear 76 of generating group 34B is connected to the pumping towheads 50P of the second and third energy storage bundles 52B and 52C. The switchgear 76 of generating group 34D is connected to the pumping towhead 50P of the fourth energy storage bundle 52D. Whilst dry splice connections are made to the switchgear 76, wet-mate connections 80 are made to the pumps 78 of the pumping towheads 50P.

The switchgear 76 of generating groups 34C and 34E is also connected to respective sets of turbo-generator units 56, serving as subsea power producers, located in the generating towheads 50G of the associated energy storage bundles 52. Specifically, the switchgear 76 of generating group 34C is connected to the generating towheads 50G of the first and second energy storage bundles 52A and 52B, whereas the switchgear 76 of generating group 34E is connected to the generating towheads 50G of the third and fourth energy storage bundles 52C and 52D. Again, whilst dry splice connections are made to the switchgear 76, wet-mate connections 80 are made to the turbo-generator units 56 of the generating towheads 50G.

The wind turbine units 10 and turbo-generator units 56 of generating groups 34C and 34E are connected via their switchgear 76 to respective busbars and to respective step-up transformers that raise the voltage from 6.6. kV to 132 kV for export of power along the high-voltage links 74 leading to shore.

FIGS. 10 and 11 are electrical diagrams that represent generating groups 34B and 34C respectively. Only six wind turbine units 10 are shown in each of these examples, illustrating that there could be any number of wind turbine units 10 in the arrays of the generating groups 34.

Each wind turbine unit 10 comprises a generator 82, a transformer 84 and switchgear 86 for controlling a ballast pump 88 to keep the wind turbine unit 10 level under wind loading as explained previously. FIGS. 10 and 11 also show the respective spar buoys 28 of generating groups 34B and 34C. Each spar buoy 28 is also equipped with a ballast pump 90 to control the draft 22 of the buoy 28.

In generating group 34B shown in FIG. 10, wet-mate connections 80 are made subsea between switchgear 76 aboard the spar buoy 28 and the pumping towheads 50P of energy storage bundles 52B and 52C for powering the pumping towheads 50P in order to expel water from energy storage bundles 52B and 52C. The sets of pumps 78 of each pumping towhead 50P are shown here with associated transformers 92 and switchgear 94.

FIG. 10 also shows how the energy storage bundle 52B electrically connects the spar buoy 28 of generating group 34B to the spar buoy 28 of generating group 34C via wet-mate connections 80 and power cables 96 extending along the energy storage bundle 52B. In particular, parallel cables 96 are used to transmit power generated by the turbine units 10 of generating group 34B to the spar buoy 28 of generating group 34C for export, and to transmit power from generating group 34C to the spar buoy 28 of generating group 34B to support operation of the pumping towheads 50P.

In generating group 34C shown in FIG. 11, wet-mate connections 80 are made subsea between switchgear 76 aboard the spar buoy 28 and the generating towheads 50G of energy storage bundles 52A and 52B for transmitting power generated by the generating towheads 50G to the spar buoy 28. The sets of turbo-generator units 56 of each generating towhead 50G are shown here with associated transformers 92 and switchgear 94.

FIG. 11 also shows the aforementioned cable connections 96 along energy storage bundle 52B for conveying parallel but opposite flows of power generated by the wind turbine units 10 and consumed by the pumps 78 associated with generating group 34B. Additionally, FIG. 11 shows how energy storage bundle 52A connects the spar buoy 28 of generating group 34C to the spar buoy 28 of generating group 34A via wet-mate connections 80. A cable 96 extending along energy storage bundle 52A thereby conveys power generated by the wind turbine units 10 of generating group 34A to the spar buoy 28 of generating group 34C.

The spar buoy 28 of generating group 34C houses a busbar 98 and a boost transformer 100 in a dry environment. The generating outputs of the wind turbine units 10 of generating groups 34A and 34B and the turbo-generator units 56 of energy storage bundles 52A and 52B are aggregated at the busbar 98. The boost transformer 100 steps up the voltage of those aggregated generating outputs to 132 kV for export to shore along one of the high-voltage links 74.

The design philosophy of the example shown in FIGS. 9 to 11 is to minimise the amount of equipment that has to be placed subsea and the number of wet-mate connectors 80 in the system. This involves trade-offs; for example, individual cables to each pump 78 could eliminate subsea switching at the cost of each pumping towhead 50P requiring multiple individual cables extending from the surface 62. Consequently, the example shown in FIGS. 9 to 11 employs readily-available subsea switching and synchronises supplies on the spar buoys 28 and towheads 50.

As the pumps 78 and turbo-generator units 56 of the energy storage bundles 52 preferably have a modular design for ease of maintenance, wet-mate connectors 80 are particularly apt for the power cables or umbilicals 54 that lead to and from those components. Qualified wet-mate connectors are limited to 11 kV and 200 A, which informs the choice of a voltage of 6.6 kV within the windfarm 66 with step-up to 132 KV for onward transmission via the high-voltage links 74 to shore.

Thus, the spar buoys 28 of the generating groups 34C and 34E serve as substations for all electrical power generated in the windfarm 66, including stepping-up the voltage from 6.6 kV within the windfarm 66 to 132 kV for onward transmission to shore. As noted above, the spar buoys 28 of the generating groups 34C and 34E provide a dry environment for the requisite boost transformers 100 and the associated high-voltage switchgear 76 and splice connections.

Electrical power generated by the windfarm 66 can be routed either directly to shore or to storage in the energy storage bundles 52. In principle, all electrical power generated by the windfarm may be stored by activating the pumps 78 with 6.6 kV 50 Hz supplies. Alternatively, the energy storage bundles 52 could be replaced by one or several export cables eventually bundled together to convey electrical power to successive hubs, then to a main export cable extending towards an onshore substation.

If there is a base load onshore, the amount of subsea equipment could be reduced by directing the outputs of individual wind turbine units 10 directly to shore to support that base load.

The windfarm 66 may be controlled from onshore, for example via a fibre-optic communication system that can control power distribution, start-up routines, synchronisation of the individual wind turbines 12, energy storage and generation systems. Additionally, monitored data from the pump s 78 and turbines 12 may be transmitted onshore and a digital twin may be produced from that data. This facilitates life-of-installation monitoring, predictive maintenance and condition monitoring.

When installing the windfarm 66, especially in a remote location, the use of costly installation vessels must be optimised. Preferably, the main infrastructure may be installed by a specialised vessel in one campaign so that subsequent tow-out and tie-in operations can be performed by a lower-specification anchor-handling vessel with ROV capability.

An initial campaign using a specialised vessel may, for example, involve: installing substation spar buoys 28 and other structures; installing anchors and wet-parking the main mooring system for the spar buoys 28; pulling-in and laying high-voltage links 74 to shore from spar buoys 28 serving as substations; and installing the first wind turbine units 10. Subsequent installation of spar buoys 28 and umbilicals 54 could be achieved by a lower-specification vessel to connect lines and umbilicals as wind turbine units 10 become available.

Installation of the energy storage bundles 52 is optional and in any event could be delayed because, for example, towing such bundles 52 to the installation site would not require a high-specification vessel. Indeed, initially at least, power generation would be possible without adding energy storage to the windfarm. This would enable the windfarm to generate revenue at an early stage, potentially contributing to the cost of manufacturing and installing energy storage bundles 52 in the future.

FIG. 15 illustrates an alternative layout for a windfarm 67 including a set 46 of generating groups 34 of wind turbine units 10 in accordance with another possible embodiment of the present invention. The windfarm 67 illustrated in FIG. 15 includes nine generating groups 34, each generating group 34 including eight wind turbine units 10 surrounding a central a spar buoy 28.

The generating groups 34 of the windfarm 67 illustrated in FIG. 15 are generally similar to the generating groups 34 described above in connection with the windfarm 66 illustrated in FIGS. 5, 7 and 8. For example, the spar buoy 28 of each group 34 is connected to the seabed 38 by a plurality of hub anchor lines 40 extending to subsea foundations 42, and the wind turbine units 10 of each group 34 are moored by mooring lines 44 that are each connected to one of the hub anchor lines 40. However, each of the wind turbine units 10 in the windfarm 67 is provided with a set of four turbine mooring lines 44 (instead of three turbine mooring lines 44 as shown in FIGS. 5, 7 and 8), including two inwardly-extending mooring lines 44 and two outwardly-extending mooring lines 44. Each of the inwardly-extending turbine mooring lines 44 is connected to the central spar buoy 28 via the upper section 40U of one of the spar buoy's anchor lines 40, and each of the outwardly-extending turbine mooring lines 44 is connected to a subsea foundation 42 via the lower section 40L of one of the spar buoy's anchor lines 40, as illustrated in FIG. 4.

As in the windfarm 66 of FIGS. 5, 7 and 8, within each generating group, each of the wind turbine units 10 is electrically connected to the central spar buoy 28 via a dynamic umbilical 64 (three of which are shown in FIG. 15), with the central spar buoy 28 being configured to act as a central hub for the wind turbine units 10 of its respective generating group 34. However, in the windfarm 67 of FIG. 15 the wind turbine units 10 are each additionally electrically connected to other wind turbine units 10 of their respective generating group 34 by additional hanging cables 65 that extend between adjacent pairs of wind turbine units 10 in order to form a network.

As shown in FIG. 15, the set 46 of generating groups 34 includes a central group 34' that is surrounded by a looped array of eight other groups 34" that together form a circular arrangement. This is in contrast to the layout of the windfarm of FIGS. 5, 7 and 8, in which the generating groups 34 are instead arranged in parallel rows.

Advantageously, the subsea foundations 42 to which the hub anchor lines 40 of the central group 34' are attached are each shared by a hub anchor line 40 of one of the surrounding groups 34", and the surrounding groups 34" also each share subsea foundations 42 with the adjacent groups 34" in the outer ring, thereby further reducing the total number of subsea foundations 42 required by the windfarm 67 and decluttering the seabed 38. In the embodiment illustrated in FIG. 15 the subsea foundations 42 to which the hub anchor lines 40 of the central group 34' are connected are more widely spaced and arranged on a wider pitch circle than the subsea foundations 42 to which the hub anchor lines 40 of the surrounding groups 34" are connected in order to facilitate the sharing of a subsea foundation 42 with each one of the surrounding groups 34". However, this need not be the case in all embodiments. For example, the spacing of the subsea foundations 42 of the central group 34' could be the same as the spacing of the subsea foundations 42 of the surrounding groups 34" in alternative embodiments in which the number of surrounding groups 34" is reduced or in which the central group 34' shares subsea foundations 42 with only some of the surrounding groups 34".

The spar buoy 28 of each of the surrounding groups 34" is electrically connected to the spar buoy 28 of the central group 34', which is configured to act as a substation for the spar buoys 28 of the surrounding groups 34". The spar buoys 28 of the surrounding groups 34" may each be connected to the spar buoy 28 of the central group 34' using direct connections 73 as shown in FIG. 16, in which the wind turbine units 10, anchor lines 40 and mooring lines 44 have been omitted for clarity. The connections may, for example, be provided by dynamic umbilicals, by cables running along the seabed 38 and/or by energy storage bundles of the type described above in connection with FIGS. 7 and 8. However, in other cases one or more of the surrounding groups 34" may be connected to the spar buoy 28 of the central group 34' indirectly via one or more of the other surrounding groups 34". The spar buoy 28 of the central group 34' is further connected to a high-voltage link 74 which is configured to export power from the windfarm 67, for example to an onshore grid (not shown).

Turning finally to FIGS. 12 to 14, these drawings show various alternative arrangements within the inventive concept for mooring and connecting central hubs and wind turbine units 10 of generating groups 34. For example, whilst the arrangements shown in FIGS. 12 and 13 have a spar buoy 28 serving as a central hub, FIG. 14 shows that the central hub could instead be a tension-leg platform 102.

In FIG. 12, a spar buoy 28 floating at the surface 62 is moored by three hub anchor lines 40 that extend to respective subsea foundations 42 embedded in the seabed 38. In this example, upper and lower sections 40U, 40L of chain are optional. A wind turbine unit 10 is moored by three turbine mooring lines 44. The hub anchor lines 40 and the turbine mooring lines 44 could be substantially or entirely of polymer rope. Two of the turbine mooring lines 44 extend to, and share, the subsea foundations 42 of two of the hub anchor lines 40. The other turbine mooring line 44 is connected directly to the wind turbine unit 10 and the spar buoy 28 as a radial line.

FIG. 12 also shows a dynamic umbilical 64 extending between the wind turbine unit 10 and the spar buoy 28 and an export cable 104 extending from the spar buoy 28 to export power, for example to another generating group 34 or directly to the shore.

In FIG. 13, the spar buoy 28 floating at the surface 62 is moored by four hub anchor lines 40 that extend to respective subsea foundations 42 embedded in the seabed 38.

In this example, each hub anchor line 40 has a central section 40C of polymer rope and upper and lower sections 40U, 40L of chain. Again, the wind turbine unit 10 is moored by three turbine mooring lines 44. Two of the turbine mooring lines 44 extend to, and intersect, respective ones of the hub anchor lines 40 at the junction between the central section 40C and the lower section 40L, hence sharing their lower sections 40L of chain. The other turbine mooring line 44 intersects one of the hub anchor lines 40 at the junction between its central section 40C and its upper section 40U, hence sharing its upper section 40U of chain adjoining the spar buoy 28.

FIG. 13 also shows a dynamic umbilical 64 extending between the wind turbine unit 10 and the spar buoy 28 and an export umbilical 54 that hangs from the spar buoy 28 to export power along an energy storage bundle 52 that lies on the seabed 38.

The tension-leg platform 102 shown in FIG. 14 comprises four taut legs 106 in this example, each extending to a respective subsea foundation 42 embedded in the seabed 38. Here, the wind turbine unit 10 is moored by four turbine mooring lines 44. Two of the turbine mooring lines 44 extend to, and share, the subsea foundations 42 of two of the legs 106. A third turbine mooring line 44 extends to an additional subsea foundation 42. The fourth turbine mooring line 44 is connected directly to the wind turbine unit 10 and to the platform 102 as a radial line.

Again, FIG. 14 also shows a dynamic umbilical 64 extending between the wind turbine unit 10 and the platform 102 and an export umbilical 54 that hangs from the platform 102 to export power along an energy storage bundle 52 that lies on the seabed 38.

Many other variations are possible without departing from the inventive concept. For example, it would be possible for a turbine mooring line 44 to extend to a subsea foundation 42 and to be fixed to the subsea foundation 42 in parallel to a hub anchor line 40, or to be fixed to a separate subsea foundation 42. Similarly, it would be possible for a turbine mooring line 44 to extend to a central hub such as a spar buoy 28 and to be fixed to that hub in parallel to a hub anchor line 40. In those cases, each turbine mooring line 44 may comprise a central section 40C of steel wire or synthetic rope and upper and/or lower sections 40U, 40L of steel chain.

The invention could be used with wind turbines 12 that turn about a substantially vertical axis rather than a substantially horizontal axis. The invention could also be used with other power-generating machines driven by tides or waves, such as tidal turbines, instead of or in addition to wind turbines 12. For example, the spar buoy 28 or other central hub and/or the supporting rafts 22 of the wind turbines 12 could support such other power-generating machines. An additional wind turbine 12 could be installed on the spar buoy 28 or other central hub. Similarly, the spar buoy 28 or other central hub and/or the surrounding wind turbine units 10 could additionally support equipment for solar power generation.

The invention claimed is:

1. A set comprising a plurality of floating electric power-generation groups, each group comprising:
    a floating hub that is anchored to a plurality of subsea foundations by a plurality of anchor lines;
    at least two floating power producer units that are connected electrically and mechanically to the hub; and
    at least one subsea energy storage unit that is electrically connected to at least one of the hubs, the energy storage unit comprising a storage volume in fluid communication with pumping machinery that is arranged to expel water from the storage volume and with generating machinery that is arranged to generate electricity from a flow of water entering the storage volume;
    wherein the power producer units are each moored by a plurality of mooring lines, at least one of those mooring lines extending inwardly toward the hub to effect mechanical connection to the hub and at least one other of those mooring lines extending outwardly away from the hub toward one of the subsea foundations to effect mechanical connection to the subsea foundation.

2. The set of claim 1, wherein the outwardly-extending mooring lines are each joined at a lower end to a lower section of a respective anchor line.

3. The set of claim 1, wherein the outwardly-extending mooring lines are each joined at a lower end directly to a respective subsea foundation.

4. The set of claim 2, wherein each of the outwardly-extending mooring lines shares one of the subsea foundations with one of the anchor lines.

5. The set of claim 1, wherein the inwardly-extending mooring lines are each joined at an upper end to an upper section of a respective anchor line.

6. The set of claim 1, wherein the inwardly-extending mooring lines are each joined at an upper end directly to the hub.

7. The set of claim 1, wherein each power producer unit is moored between an adjacent pair of the anchor lines radiating from the hub.

8. The set of claim 7, wherein, in top plan view, the power producer units are closer to the hub than the subsea foundations.

9. The set of claim 1, wherein each of the mooring lines extending from the power producer units converges with one of the anchor lines.

10. The set of claim 9, wherein each of the mooring lines intersects one of the anchor lines.

11. The set of claim 10, wherein the mooring lines intersect the anchor lines at junctions between a major central wire or rope section of the anchor line and a minor upper or lower chain section of the anchor line.

12. The set of claim 1, wherein the power producer units are substantially equidistant from the hub.

13. The set of claim 12, wherein the power producer units are distributed around a substantially circular array that is centered the hub.

14. The set of claim 13, wherein the power producer units and the anchor lines alternate circumferentially around the hub.

15. The set of claim 1, wherein the hub is a spar buoy or a buoyant platform.

16. The set of claim 1, wherein the anchor lines and/or the mooring lines are catenaries or taut legs held in tension by buoyant upthrust of the hub and/or the power producer units.

17. The set of claim 1, wherein the hub houses switchgear in a dry environment.

18. The set of claim 1, further comprising power umbilicals that effect electrical connections between the power producer units and the hub.

19. The set of claim 18, wherein the power umbilicals hang as catenaries between the power producer units and the hub.

20. The set of claim 1, wherein the hub comprises a step-up transformer connected to a power export link.

21. A set comprising a plurality of floating electric power-generation groups, each group comprising:
    a floating hub;
    at least two floating power producer units that are connected electrically to the hub; and
    at least one subsea energy storage unit that is electrically connected to at least one of the hubs, the energy storage unit comprising a storage volume in fluid communication with pumping machinery that is arranged to expel water from the storage volume and with generating machinery that is arranged to generate electricity from a flow of water entering the storage volume;
    wherein the floating hub is anchored to a plurality of subsea foundations that are located in plan view between the power producer units and the hub;
    wherein the power producer units are each moored by a plurality of mooring lines, at least one of those mooring lines extending inwardly toward and effecting mechanical connection to one of the subsea foundations located between the power producer unit and the hub, and at least one other of those mooring lines extending outwardly away from the hub toward a further subsea foundation located outboard of the power producer unit in plan view to effect mechanical connection to the further subsea foundation.

22. The set of claim 21, wherein each power producer unit is additionally moored by a further mooring line that extends inwardly toward the hub to effect mechanical connection to the hub.

23. The set of claim 21, wherein the power-generation groups of the set are arranged in at least two rows.

24. The set of claim 21, wherein the power-generation groups of the set include a central power-generation group and an array of power-generation groups that at least partially surround the central power-generation group.

25. The set of claim 21, wherein anchor lines extending from hubs of different groups of the set are anchored to the same subsea foundations.

26. The set of claim 21, wherein the hub of at least one group of the set is configured to serve as an electrical substation for the hub of at least one other group of the set.

27. The set of claim 21, wherein the storage volume of the energy storage unit is elongate, extends between groups of the set and comprises terminal structures at each end, the terminal structures housing the pumping and generating machinery.

28. The set of claim 27, wherein the pumping machinery is housed in a terminal structure at one end of the energy storage unit and the generating machinery is housed in a terminal structure at an opposite end of the energy storage unit.

29. The set of claim 27, wherein, in top plan view, each terminal structure is located closer to a hub than the power producer units of a group comprising that hub.

30. The set of claim 21, wherein the pumping machinery is positioned at a greater water depth than the generating machinery.

31. The set of claim 21, wherein the energy storage unit comprises at least one cable that effects electrical connection between the hubs of different groups of the set.

32. The set of claim 21, wherein the hub of at least one group of the set is configured to switch power generated by the power producer units of that group to drive the pumping machinery of the at least one energy storage unit.

33. The set of claim 21, wherein the hub of at least one group of the set is configured to combine power generated by the power producer units of that group with power generated by the generating machinery of the at least one energy storage unit.

34. A set of floating electric power-generation groups, each group comprising a floating hub, a plurality of floating power producer units that are connected electrically to the hub, and at least one subsea energy storage unit that is electrically connected to at least one of the hubs, the energy storage unit comprising a storage volume in fluid communication with pumping machinery that is arranged to expel water from the storage volume and with generating machinery that is arranged to generate electricity from a flow of water entering the storage volume;
wherein the hub of at least one of the power-generation groups is connected electrically to and configured to serve as an electrical substation for the hub of at least one other of the power-generation groups.

35. A set according to claim 34, wherein the power-generation groups of the set are arranged in at least two rows including a first row and a second row, wherein the hub of at least one of the power-generation groups in the first row is connected electrically to and configured to serve as an electrical substation for the hub of at least one of the power-generation groups in the second row.

36. A set according to claim 34, wherein the power-generation groups of the set include a central power-generation group and an array of power-generation groups that at least partially surround the central power-generation group, wherein the hub of the central power-generation group is connected electrically to and configured to serve as an electrical substation for the hub of at least one of the surrounding power-generation groups.

37. An offshore electric power-generation arrangement, comprising:
a plurality of electric power-generation groups, each group comprising a hub that is connected electrically to a plurality of power producer units;
at least one subsea energy storage unit that electrically connects the hub of one of the groups to the hub of another of the groups; and
wherein the energy storage unit comprises a storage volume in fluid communication with pumping machinery that is arranged to expel water from the storage volume and with generating machinery that is arranged to generate electricity from a flow of water entering the storage volume.

38. The arrangement of claim 37, wherein the storage volume is elongate, extends between the hubs of the groups and comprises terminal structures at each end, the terminal structures housing the pumping and generating machinery.

39. The arrangement of claim 38, wherein the pumping machinery is housed in a terminal structure at one end of the energy storage unit and the generating machinery is housed in a terminal structure at an opposite end of the energy storage unit.

40. The arrangement of claim 38, wherein, in top plan view, each terminal structure is located closer to a hub than the power producer units of a group comprising that hub.

41. A method of generating electrical power offshore, the method comprising:
generating electrical power using a plurality of electric power-generation groups, each group comprising a hub that is connected electrically to a plurality of power producer units; and
conveying the generated electrical power from the hub of one group to the hub of another group via at least one subsea energy storage unit;
converting the generated electrical power to potential energy by pumping water from a storage volume of the at least one subsea energy storage unit; and
converting the potential energy to recovered electrical power by admitting a flow of water into the storage volume.

* * * * *